(12) United States Patent
Komiya et al.

(10) Patent No.: US 6,466,334 B1
(45) Date of Patent: Oct. 15, 2002

(54) COLOR REPRODUCING DEVICE

(75) Inventors: Yasuhiro Komiya, Hino; Kensuke Ishii, Tokyo; Nagaaki Ohyama, Kawasaki; Masahiro Yamaguchi; Takashi Obi, both of Yokohama, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/149,906

(22) Filed: Sep. 8, 1998

(30) Foreign Application Priority Data

Sep. 9, 1997 (JP) ............................................. 9-243634

(51) Int. Cl.[7] .......................... H04N 1/46; G06K 15/00
(52) U.S. Cl. ........................................ 358/1.9; 358/501
(58) Field of Search ................................. 358/501, 504, 358/518, 1.9; 382/167

(56) References Cited

U.S. PATENT DOCUMENTS

| | | | | |
|---|---|---|---|---|
| 5,739,928 A | | 4/1998 | Scott | 358/520 |
| 5,828,780 A | * | 10/1998 | Suzuki | 382/167 |
| 5,898,507 A | * | 4/1999 | Nakane | 358/448 |
| 5,963,756 A | * | 10/1999 | Sakai | 399/39 |
| 6,118,455 A | * | 9/2000 | Hidaka | 345/431 |

FOREIGN PATENT DOCUMENTS

JP  6-51732  2/1994  ............ G09G/5/02

\* cited by examiner

*Primary Examiner*—Jerome Grant, II
(74) *Attorney, Agent, or Firm*—Frishauf, Holtz, Goodman & Chick, P.C.

(57) ABSTRACT

In a color reproduction device, an input profile that is referenced in converting an input image from an image input device into a device-independent color image is created based on image input device information, shooting- and observation-time lighting data, and subject data, allowing accurate conversion of the input image to the device-independent color image. In reproducing the image by an image output device, the spectral reflectance of the subject itself is calculated from image input device information and shooting-time lighting data, thereby reducing the effect of the shooting-time lighting. The colors of the subject under observation lighting are calculated from observation-time lighting data. A color reproduced image is estimated accurately on the basis of the subject data even if the input image has little information.

26 Claims, 25 Drawing Sheets

COLOR REPRODUCING DEVICE

BACKGROUND OF THE INVENTION

The present invention relates to a color reproducing device which transfers accurately the colors of an image of a subject captured by an image input device to an output device.

Various attempts have been made hitherto to print or display colors as they are perceived by the human visual system.

As the performance of computers has been upgraded and their size has been reduced and with the spread of desktop publishing (DTP) systems, color matching techniques have been proposed for matching colors displayed on TV monitors and colors to be printed on printed matter as an object of input and output :(for example, U.S. Pat. No. 5,739,928, Japanese Unexamined Patent Publication No. 6-51732, and so on).

A color management system (CMS), which is typical of the color matching techniques, is equipped, as shown in FIGS. 32 and 33, with a color corrector 3 between an image input device 1 and an image output device 2. The color corrector 3 has an input profile 4 and an output profile 5 on the image input side (shooting side) and the image output side (observer side), respectively. Input colors are first converted to colors that do not depend on the image input device 1 and the image output device 2 (hereinafter referred to as device independent colors) and then the matching of input and output colors is performed.

In U.S. Ser. No. 08/763,230, there is disclosed a color image recording and reproducing system in which, as shown in FIG. 34, an image captured in. a place remote from a place where it is reproduced is transmitted, and color matching is performed in spectrum to reproduce (display or print) colors accurately.

More specifically, in this system, a multi-spectral image of a subject is shot, and lighting spectral data when the image was shot and lighting spectral data at the time the image is reproduced are used to effect conversion in such a way that, under lighting on the reproduction side, the spectral image of the subject is obtained as it was shot.

That is, the colors and gloss of the subject when it was shot are changed to suit the reproducing lighting, allowing the state of the subject when it was shot to be observed.

Next, a multidimensional spectral image is converted into a three-dimensional vector image composed of X, Y, and Z values and then transmitted to the reproducing site. In the reproducing site, the image is converted to color signals corresponding to the spectral characteristics of the reproducing device and then outputted to a device.

The color corrected image is displayed on an output medium (monitor) of FIG. 34.

The output profile is created in accordance with the following procedure.

A monitor 131 and a chromaticity meter 132 are set in a place, such as a dark room, which is not affected by outside light. As shown in FIG. 35, predetermined RGB signals are generated by an RGB signal generator 133 and displayed on the screen of the monitor under the control of a display controller 134. The colors displayed are measured by the chromaticity meter 132.

The output signals of the chromaticity meter 132 are detected by a chromaticity detector 135 as chromaticity values such as XYZ values. The detected signals are then sent to an output profile computation unit 136.

The output profile computation unit computes an output profile from the relationship between the RGB values generated by the RGB signal generator 133, and the chromaticity valued detected by the chromaticity meter 135.

The relationship between the RGB values outputted to the monitor 131 and the XYZ values outputted from the monitor 131 will be described next.

The monitor has RGB phosphors that produce the three primary colors, red, green, and blue, and produces a color image by exciting those phosphors by electron beams modulated by R. G and B signals. The values of the R, G and B signals (the RGB values) are produced by the RGB signal generator 133 of FIG. 35.

The RGB values are converted in a non-linear manner by the gamma ($\gamma$) characteristic of the monitor 131. Let the gamma characteristic of the RGB phosphors be denoted by $\gamma r[\ ]$, $\gamma g[\ ]$, and $\gamma b[\ ]$, respectively. The colors produced by the RGB phosphors are combined by eye into a color; thus, the chromaticity values (XYZ values) outputted from the monitor are represented by the sums of signal values each subjected to the corresponding gamma characteristic as follows:

$$\begin{pmatrix} X \\ Y \\ Z \end{pmatrix} = \begin{pmatrix} Xr\ max & Xg\ max & Xb\ max \\ Yr\ max & Yg\ max & Yb\ max \\ Zr\ max & Zg\ max & Zb\ max \end{pmatrix} \begin{pmatrix} \gamma r[R] \\ \gamma g[G] \\ \gamma b[B] \end{pmatrix} \quad (11)$$

where Xrmax, Yrmax and Zrmax are the X, Y and Z values when the R phosphor produces the maximum brightness, Xgmax, Ygmax and Zgmax are the X, Y and Z values when the G phosphor produces the maximum brightness, and Xbmax, Ybmax and Zbmax are the X, Y and Z values when the B phosphor produces the maximum brightness.

The RGB values to obtain desired XYZ values can be calculated using equation (11) as follows:

$$\text{matrix transform} \begin{pmatrix} R' \\ G' \\ B' \end{pmatrix} = \begin{pmatrix} Xr\ max & Xg\ max & Xb\ max \\ Yr\ max & Yg\ max & Yb\ max \\ Zr\ max & Zg\ max & Zb\ max \end{pmatrix}^{-1} \begin{pmatrix} X \\ Y \\ Z \end{pmatrix} \quad (12)$$

$$\text{gamma correction } \begin{matrix} R = \gamma r^{-1}[R'] \\ G = \gamma g^{-1}[G'] \\ B = \gamma b^{-1}[B'] \end{matrix}$$

The processing flow is illustrated in FIG. 36.

In this arrangement, an output profile computation unit 136 computes matrix coefficients for matrix transform and gamma correction values for gamma correction from the RGB values and the XYZ values and stores them into an output profile storage unit 137. A device value conversion unit 138 makes matrix transform and gamma correction on the XYZ values using the matrix coefficients and the gamma correction values and outputs RGB values to the image display controller 134 for display on the monitor.

The conventional color management system described above specifies D50 for the light source used on both the input side and the output side. Therefore, a color mismatching problem will arise when an image is shot under a light source different from D50 or when an output image is observed under a light source different from D50.

In the conventional color image recording and reproducing system illustrated in FIG. 34, it is assumed that, on the shooting side, an image is converted to chromaticity values, such as XYZ values, to suit the lighting on the observer side and then transmitted to the observer side.

An image, once converted to XYZ values, has no longer spectral information. Thus, on the observer side, no data conversion can be made to suit the lighting.

Only the spectral data on light used in shooting and the spectral data-on light used in observation are used for color matching. In order to increase the accuracy of color reproduction, therefore, it is required that an input image itself should have a certain amount of spectral information.

For this reason, the image input device must be a multi-spectral camera capable of capturing spectral images in many bands, which makes it difficult to shoot a subject in one shot. In addition, a captured image will involve a large amount of data.

In displaying a color corrected image on the monitor, offset light (light of monitor emitted when the input value is zero) and environment light (light of surrounding place where the monitor is installed) will have influence on color reproduction. Thus, satisfactory color reproduction is not necessarily achieved even if an output profile is created for the monitor by the conventional technique.

When the power is applied to the monitor and then RGB signals such that R=G=B=0 are applied to the monitor, the monitor screen will not display black (X=Y=Z=0) due to the influence of offset light of the monitor.

In a place where the monitor is set, there generally exists some light source or outdoor light (sun light) which illuminates the monitor screen. Under such conditions, reflection from the monitor screen occurs and hence it does not follow that X=Y=Z=0 even when the power is not applied to the monitor. That is, the monitor offset light and the environment light are added to an image to be displayed on the monitor. The sum of the monitor offset light and the environment light is referred hereinafter to as a bias value.

If a profile is created taking the bias value into account, then accurate color reproduction will be achieved. However, the offset light and the environment light vary greatly with time. For example,.the offset light varies greatly until the monitor becomes stabilized from when the power was applied thereto.

In addition, the bias value will vary greatly when a light source used as environment light is changed, or subjected to a change with the passage of time, or the outdoor light varies. The recreation of the output profile with each variation of the offset light or environment light requires not only expert knowledge but also a large amount of time.

BRIEF SUMMARY OF THE INVENTION

It is an object of the present invention to provide a color reproduction device which makes image conversion while referencing image input device information, and color reproduction environment information containing shooting- and observation-time lighting spectral information and information concerning the statistical nature of the spectrum of a subject, allows the image shooting and reproducing sites to be remote from each other, and allows accurate color reproduction even when offset light and environment light vary.

To attain the object, there is provided a color reproduction device for outputting an image of a subject shot by an image input device to an image output device in displayed or printed form, which comprises an input profile creation section for creating an input profile that conforms to information concerning the image input device and environment information containing shooting- and observation-time lighting data and information concerning the optical nature of the subject, a device-independent color conversion section having an input profile operation section for causing the input profile to operate on the image to convert it to a device-independent color image, and a device value conversion section for causing an output profile created in accordance with information concerning the image output device to operate on the device-independent color image to convert it to device values.

Additional objects and advantages of the invention will be set forth in the description which follows., and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will be made to FIGS. 1 through 7 to describe a first embodiment of a color reproduction device of the present invention.

Figure 1:
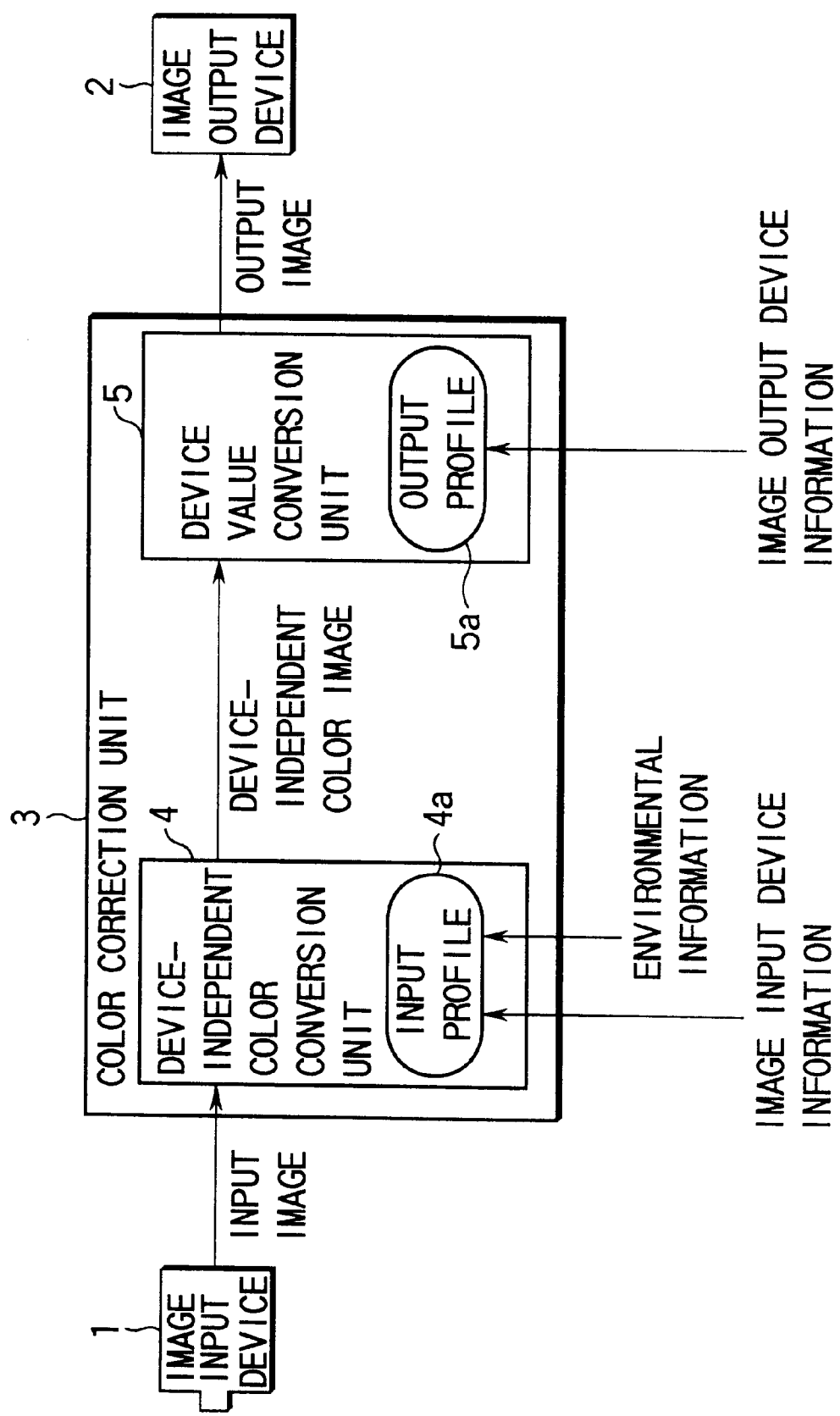
FIG. 1 is a schematic illustration of a first embodiment of a color reproduction device of the present invention.

As shown in FIG. 1, the color reproduction device is composed roughly of an image input device 1 for capturing an image of a subject, a color correction unit 3 for correcting the colors of the image, and an image output device 2 for outputting (displaying or printing) an output image.

The color correction unit 3 is composed of a device independent color conversion unit 4 and a device value conversion unit 5.

The device independent color conversion unit 4 converts the colors of an input image to device, independent colors by making a reference to an input profile 4a, thereby producing a device independent color image. The device value conversion unit 5 makes a reference to an output profile 5a to convert the. device independent color image to an output image that have values that match the characteristics of the image output device 2.

Figure 2A:
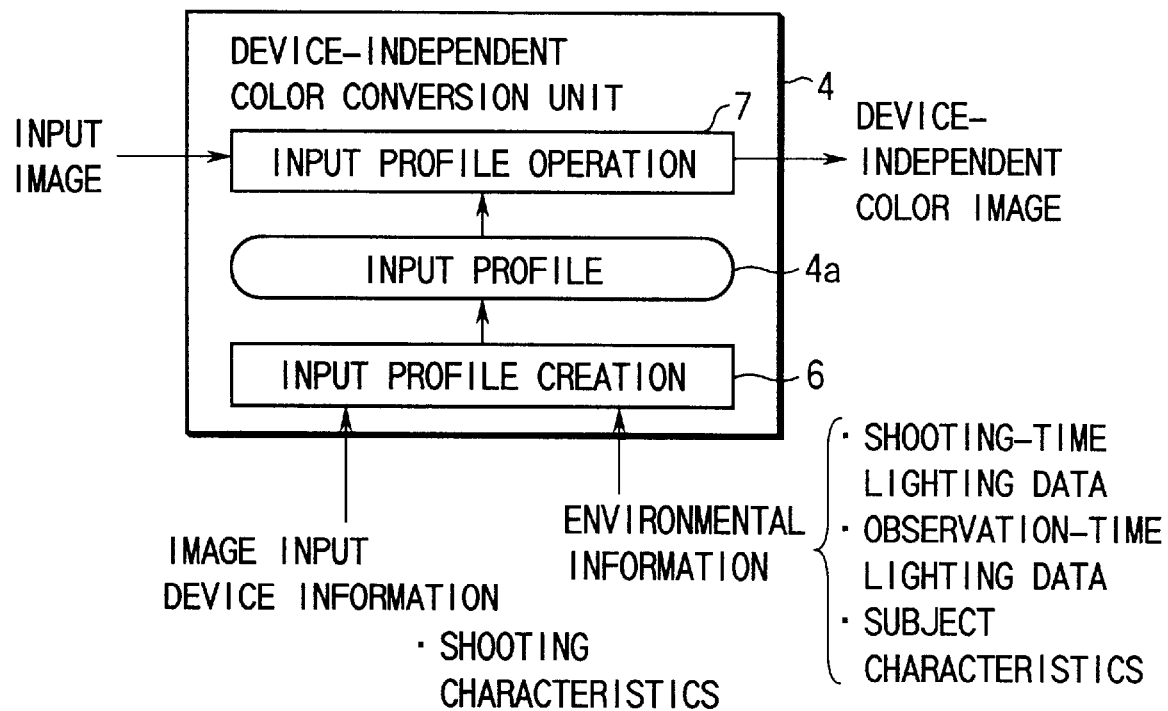
FIG. 2A show arrangements of the device-independent color conversion unit, respectively, of FIG. 1.

The device independent color conversion unit 4 is constructed, as shown in FIG. 2A, from an input profile creation unit 6 and an input profile operation unit 7. The input profile creation unit 6 is responsive to image input device information and environmental information about a color reproduction environment to create and output an input profile 4a to the input profile operation unit 7. The operation unit 7 causes the input profile to operate on the input image to provide image color conversion.

Figure 4:
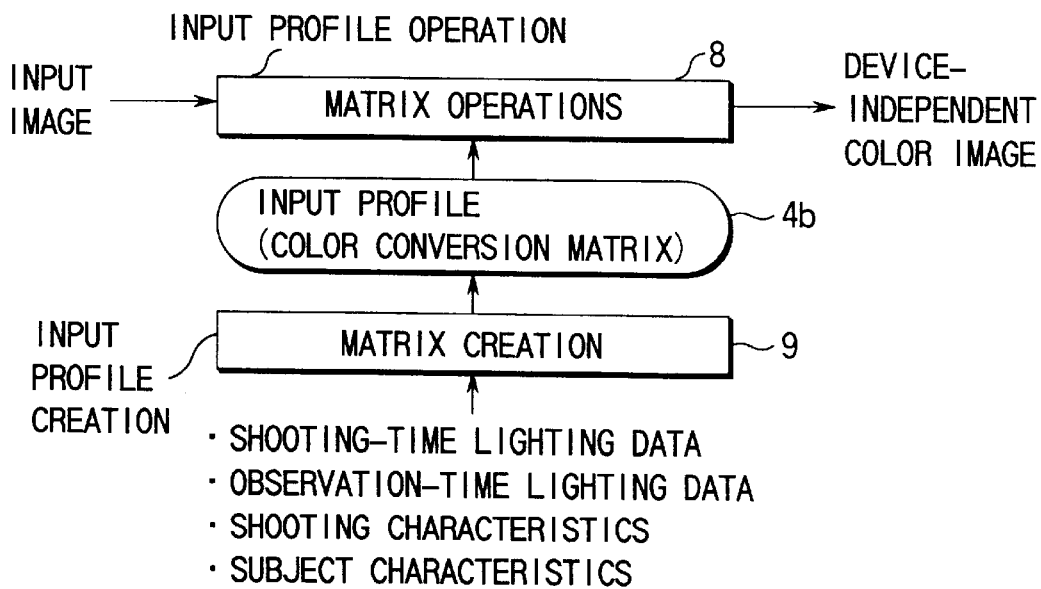
FIG. 4 shows an arrangement of the device independent color conversion unit.

As shown in FIG. 4, the input profile creation unit 6 may be arranged as a matrix creation unit 9 and the input profile operation unit 7 may be arranged as a matrix operations unit 8. Thus, since an input profile can be created by means of matrix operations, an input image can be converted into a device-independent color image at high speed.

Figure 3:
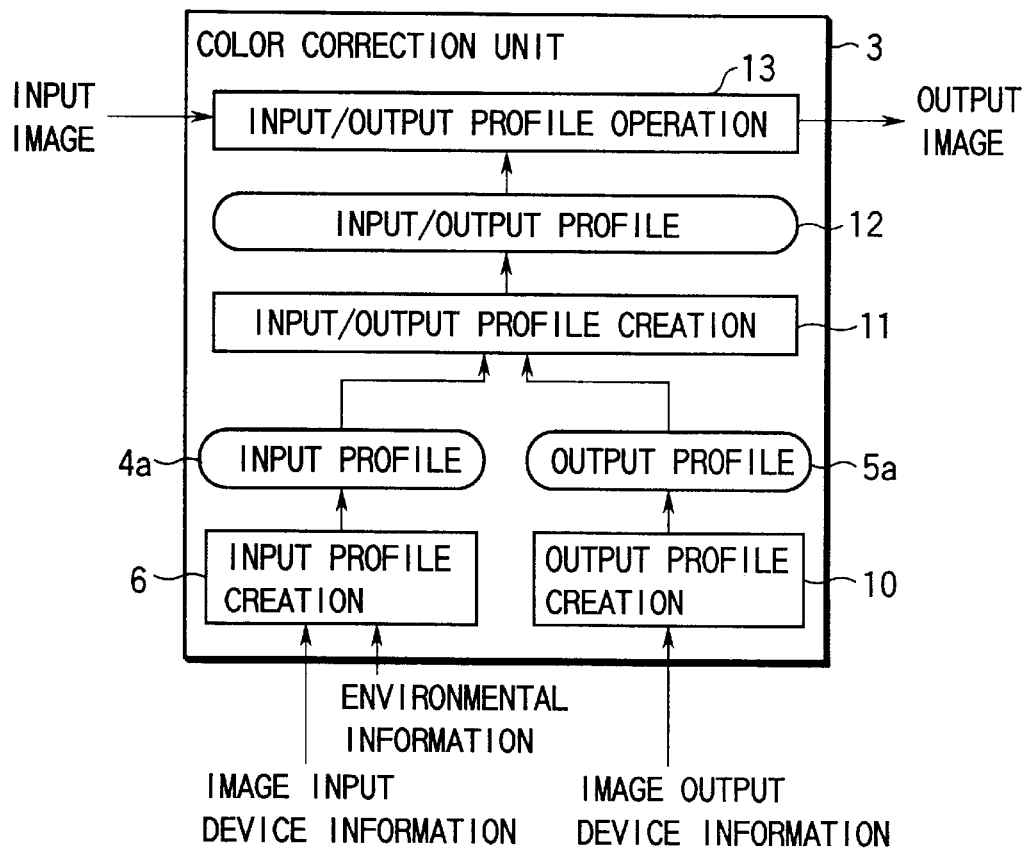
FIG. 3 shows another arrangement of the color correction unit of FIG. 1.

The color correction unit 3 includes, as shown in FIG. 3, an input/output profile creation unit 11 and an input/output profile operation unit 13 to create an input/output profile 12 from the input profile 4a and the output profile 5a. In this manner, the input profile 4a and the output profile 5a can be concatenated to make fast conversion from an input image to an output image.

The input profile creation unit 6, which creates an input profile taking into account various items of information for creating a color reproduced image, can convert an input image to a device-independent color image with accuracy.

Figure 2B:
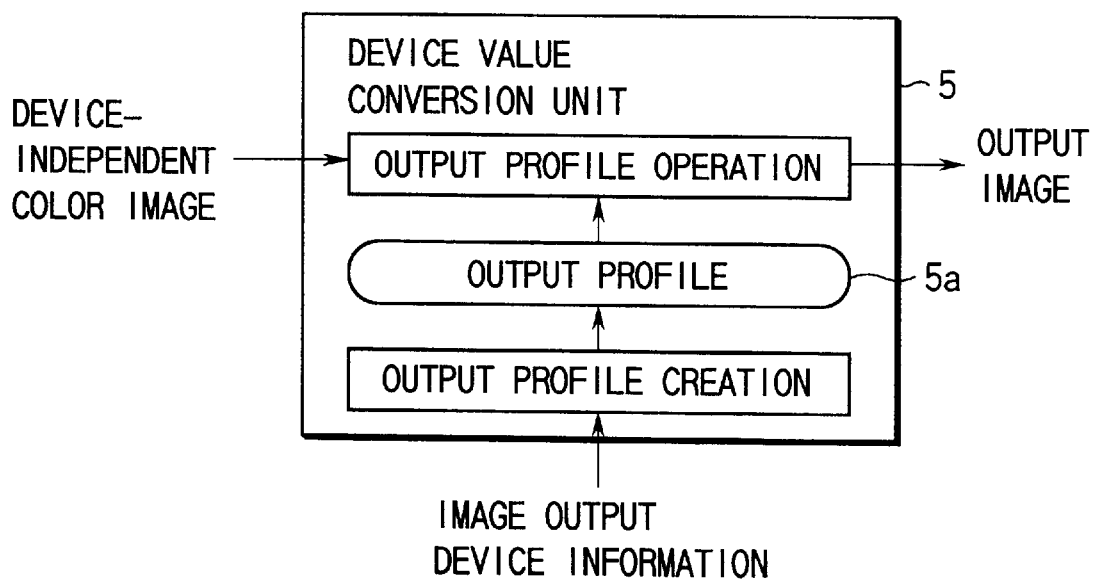
FIG. 2B show arrangements of the device value conversion unit, respectively of FIG. 1.

The image input device information shown in FIG. 2 contains the characteristics of the image input device used in shooting and setting states (hereinafter referred to as shooting characteristics). On the other hand, the environment information contains spectral data concerning lighting used in capturing an image of a subject with the image input device (hereinafter referred to as shooting-time lighting data), spectral data concerning a light source in the place where the image of the subject is watched (hereinafter referred to as observation-time lighting data), and information concerning the statistical nature of the spectrum of the subject which was shot (hereinafter referred to as subject characteristics).

The use of the shooting characteristics permits a color reproduced image of the subject shot by the image input device to be estimated with accuracy. Even if the image input device is a multi-spectral camera that captures a plurality of spectral images of a subject or a digital camera, color reproduction can be achieved.

The use of the shooting-time lighting data permits the effect of lighting at the shooting time to be canceled. That is, even if a subject is shot under any lighting (for example, fluorescent lamp, incandescent lamp, sunlight, and so on), the accurate spectral reflectance of the subject itself can be calculated. Also, the use of the observation-time lighting data permits colors under lighting in the place where the subject image is actually watched to be calculated. The use of the subject characteristics permits a color reproduced image to be estimated with accuracy even if an input image has little spectral information.

Figure 5:
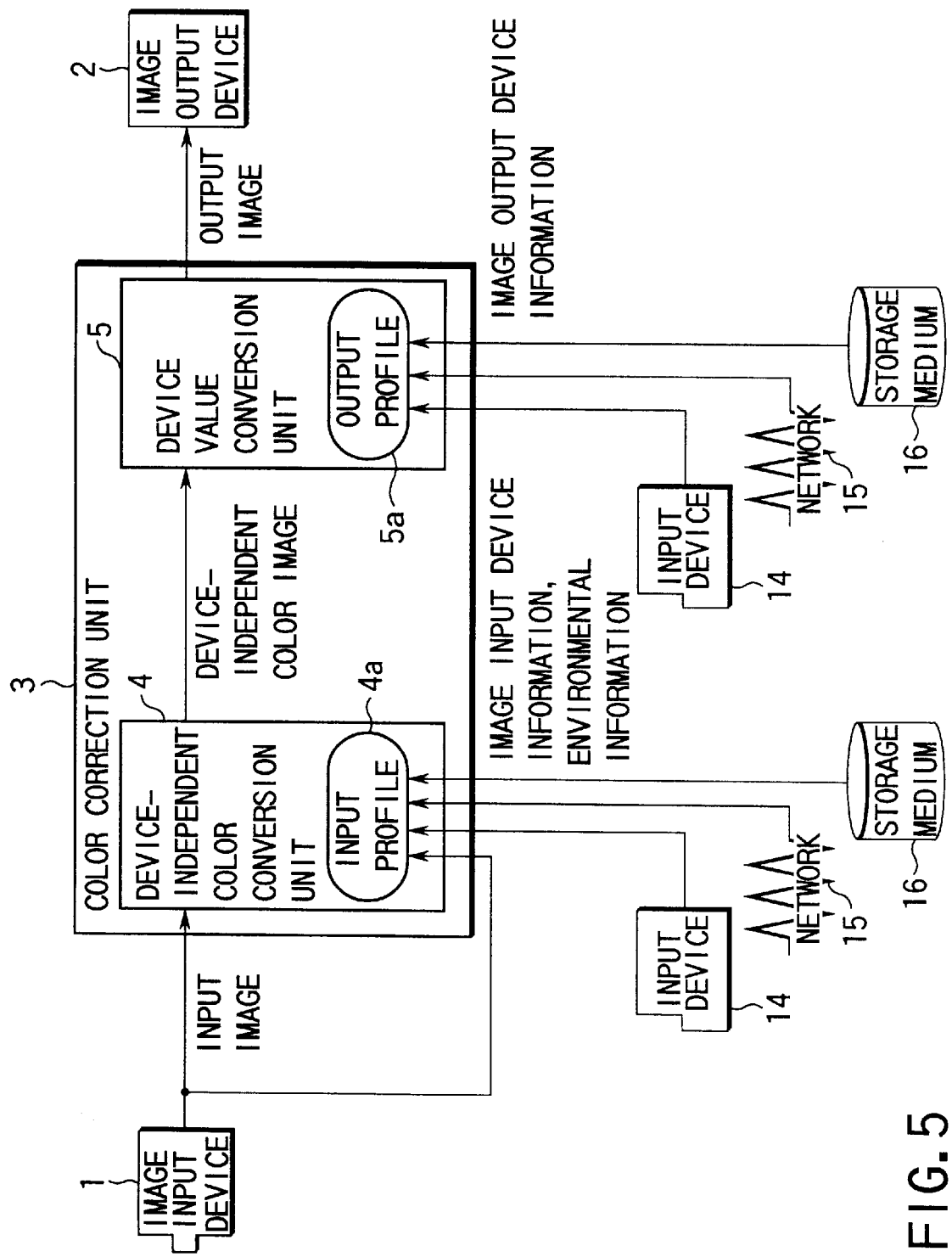
FIG. 5 is a diagram for use in explanation of a way of inputting environmental information to the correction unit.

Next, the environmental information entered into the color correction unit 3 will be described with reference to FIGS. 5 and 6.

The environmental information is provided from the image input device 1, a dedicated input device 14, a network 15, or a storage medium 16.

When the environmental information is input from the image input device 1 or another input device, shooting-time environmental information can be obtained in real time, which, even when the environment varies from hour to hour, allows an input profile that, provides accurate conversion to a device-independent color image to be created.

Where the environmental information is provided from the network 15 or the storage medium 16, an input profile can be created to suit the environment at the remote site or the past environment.

Figure 6:
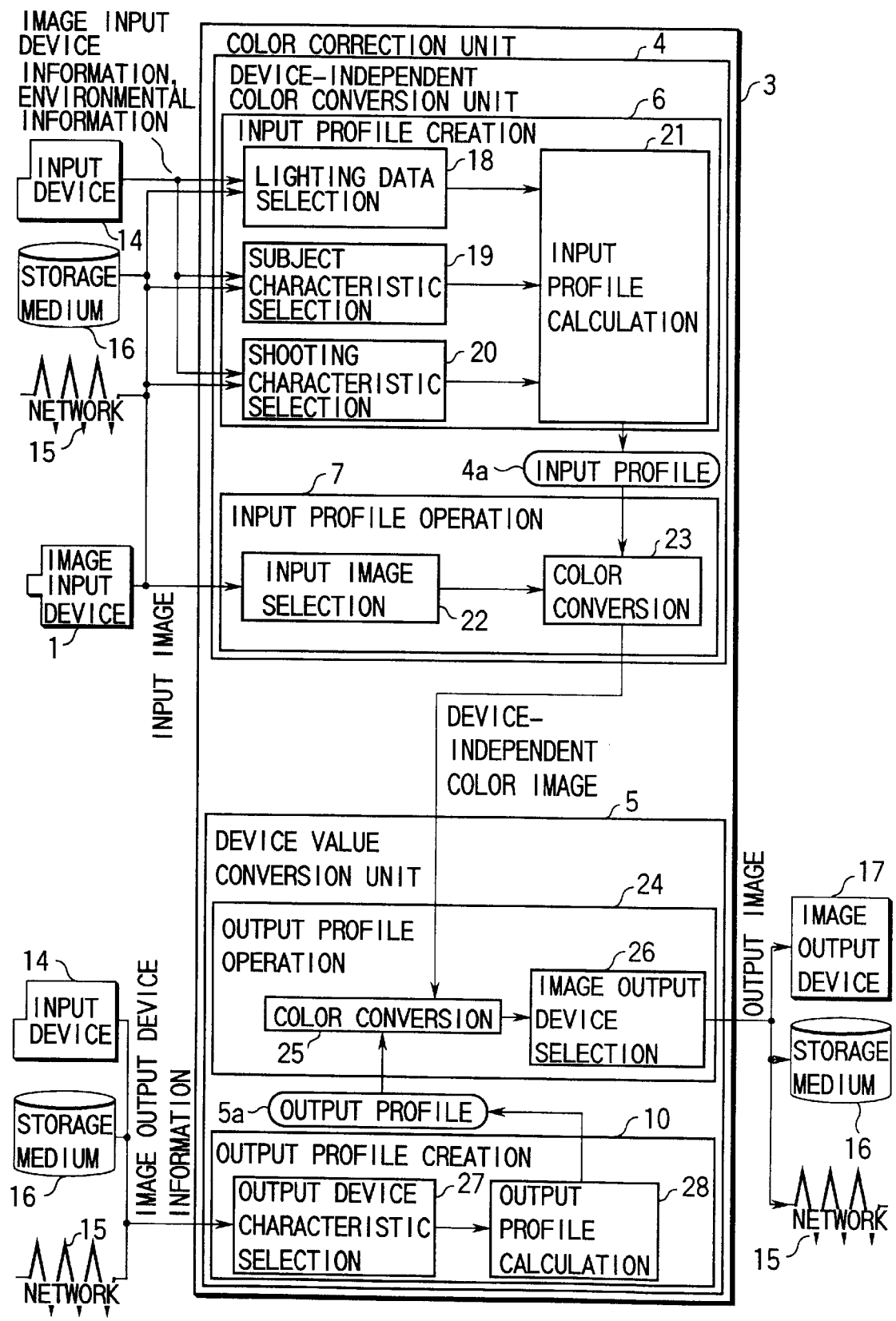
FIG. 6 is a diagram for use in explanation of a way of inputting environmental information to the correction unit.

As shown in FIG. 6, the color correction unit.3 is composed roughly of the device-independent color conversion unit 4 and the device value conversion unit 5.

The input profile creation unit 6 in the device-independent color image conversion unit 4 comprises an lighting data select unit 18, a subject characteristic select unit 19, a shooting characteristic select unit 20, and an input profile calculation unit 21.

The lighting data select unit 18, the subject characteristic select unit 19, and the shooting characteristic select unit 20 receive image input device information and environment information from the input device 14 or the like. The input profile calculation unit 21 calculates input profile 4a based on the outputs of the select units. The input profile operation unit 7 is composed of an input image select unit 22 which makes a selection among input images and a color conversion unit 23 which converts the selected image to a device-independent color image on the. basis of the input profile 4a.

An output profile operation unit 24 in the device value conversion unit 5 comprises a color conversion unit 25 which performs a color conversion process on the device-independent color image on the basis of the output profile 5a to provide an output image, and an output device select unit 26 which selects an output device to which the output image is to be directed and then directs the output image to either image output device 17, storage medium 16, or network 15.

The output profile creation unit 10 for creating the output profile 5a is composed of an output device characteristic select unit 27 which selects necessary information from output device information and an: output profile calculation unit 28 which calculates the output profile 5a based on the selected output device characteristics.

The components in the present embodiment may be subjected to various modifications and variations.

For example, the image input device 1 may be a multi-spectral camera using a plurality of bandpass filters, a multi-spectral camera using a wavelength-variable filter using liquid crystals, a multi-spectral camera in which an optical path is split by means of prisms, or a digital camera. The image output device 17 may be either a TV monitor, a projector, or a printer.

To obtain spectral data, a spectroscope or multi-spectral camera can be used as the input device 14. The same system may be installed at a remote site on the network 15 for transmission of images and environmental information between the systems. As the storage medium, use is made of a floppy disk, a magneto-optical (MO) disk, or the like.

Figure 7:
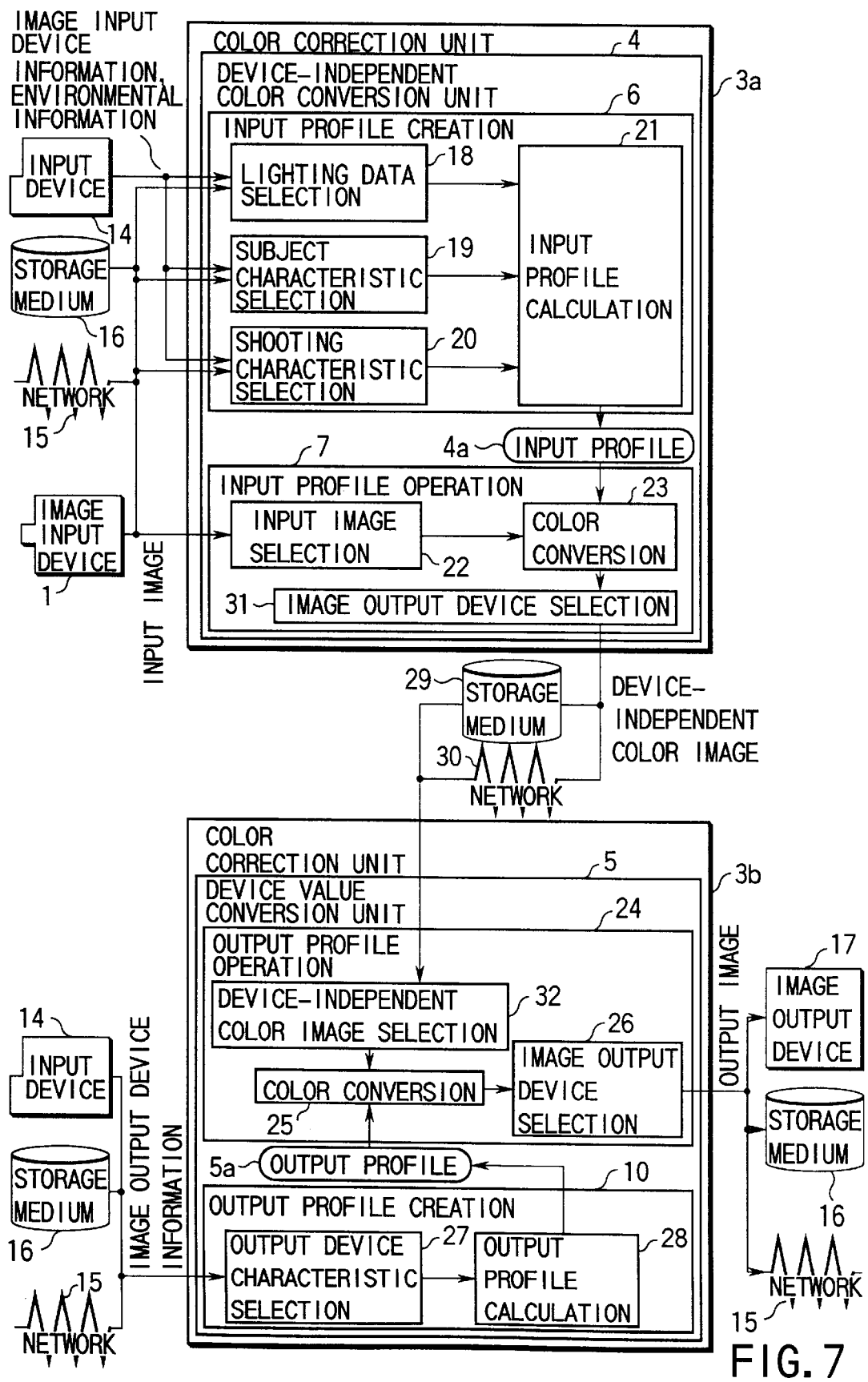
FIG. 7 shows an arrangement of the color correction unit which is separated into a color correction preprocessing unit and a color correction post processing unit.

In such an arrangement, as shown in FIG. 7, the color correction unit 3 may be separated into a color correction preprocessing section 3a and a color correction postprocessing section 3b. In this case, an output device for a device-independent color image from the color conversion unit 23 is selected by the output device select unit 31 in the preprocessing section 3a and then sent to the postprocessing section 3b via a storage medium 29 or a network 30. A selection is made by the device independent color image select unit 32 in the output profile operation unit 24, and the selected image is subjected to color conversion based on the output profile 5a in the color conversion unit 25.

This embodiment is sometimes effective in storing or transmitting image data because the device-independent color image requires a smaller data size than images in a format that allows lighting conversion. In FIG. 7, corresponding parts to those in FIG. 5 are denoted by like reference numerals and descriptions thereof are omitted.

Figure 8:
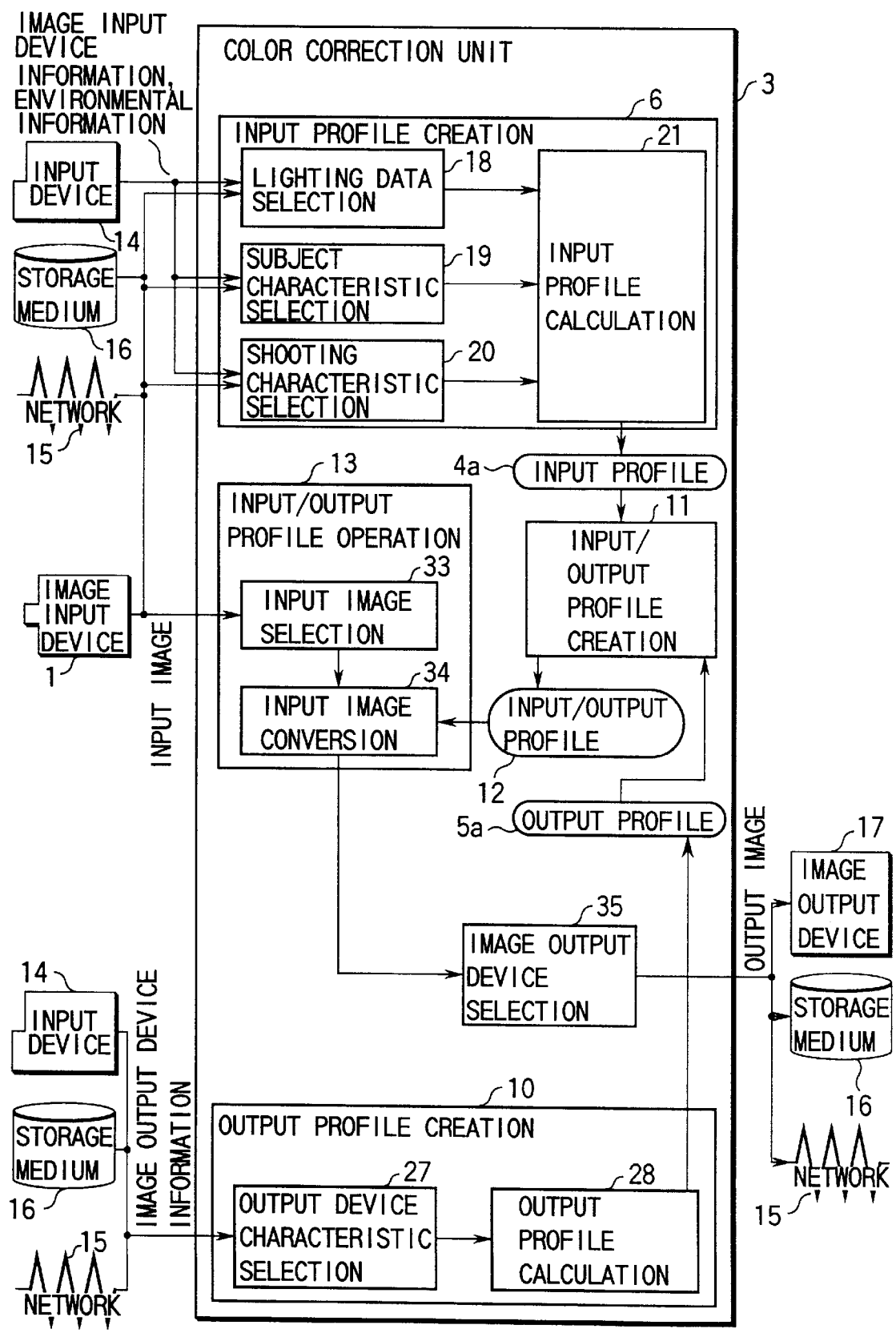
FIG. 8 shows an arrangement for creating an input/output profile by concatenating an input profile and an output profile.

Next, an arrangement in which the input profile 4a and the output profile 5a are combined into an input/output profile 12 will be described with reference to FIGS. 8 and 3.

The input/output profile operation unit 13 in the color correction unit 3 comprises an input image select unit 33 which makes a selection among input images and an input image conversion unit 34 which converts a selected input image based on the created input/output profile 12. The image subjected to conversion is directed to an output device selected by an image output device select unit 35.

Such an arrangement requires that an input image be subjected to conversion one time only, thus further increasing the processing speed as compared with the arrangement of FIG. 6.

Figure 9:
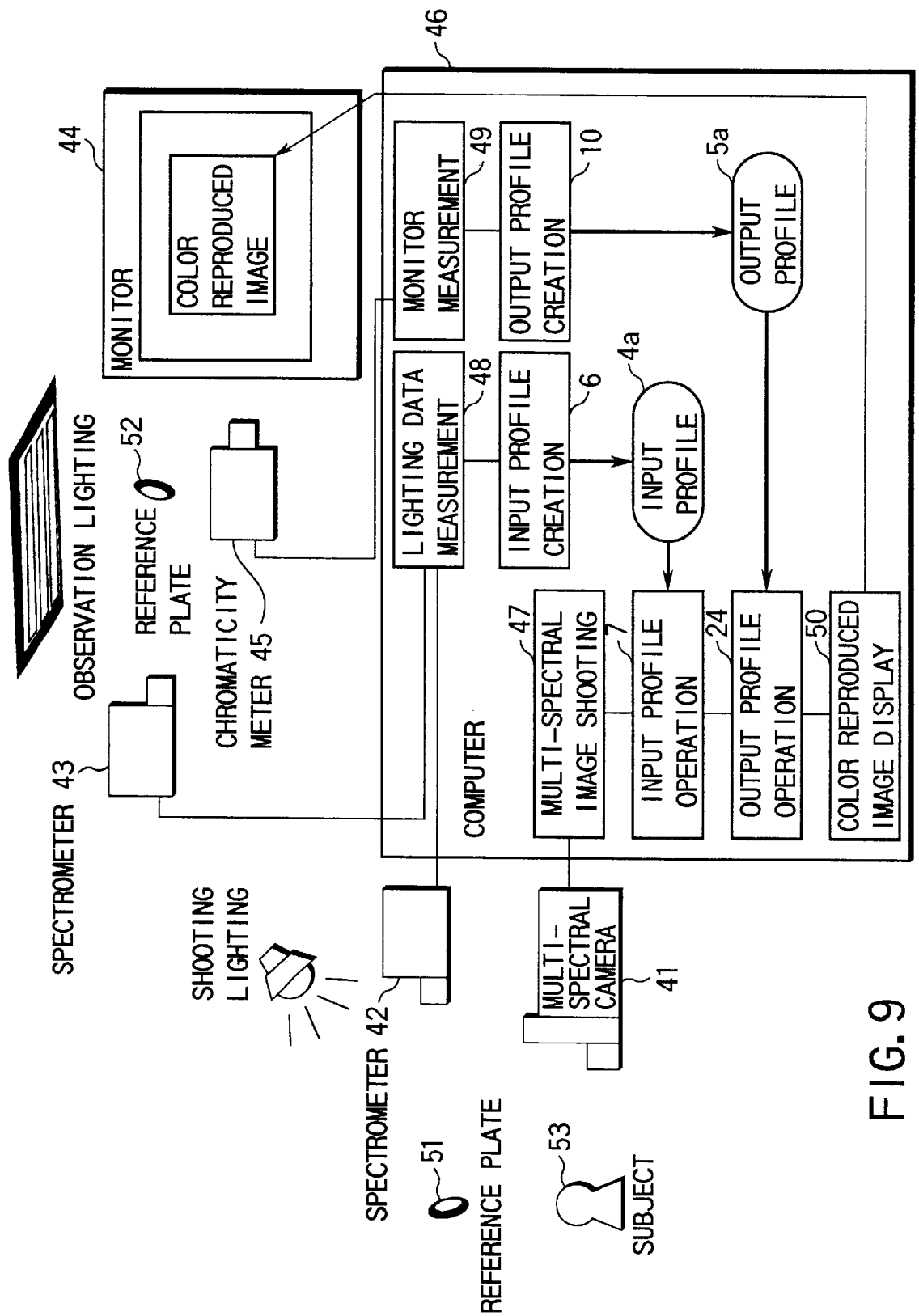
FIG. 9 shows a specific arrangement of the color reproduction device according to the first embodiment.

FIG. 9 shows a specific arrangement of the color reproduction device according to the first embodiment of the present invention. This embodiment, implemented in computer software, is an example of a system arranged to produce and display a color reproduced image on a monitor.

As shown in FIG. 9, this system is composed of a multi-spectral camera 41 which captures multi-spectral images of a subject 53, spectrometers 42 and 43, a monitor 44, a chromaticity meter 45 for measuring the profile of the monitor 44, and a computer 46.

Of the sections implemented in software in the computer 46, those functioning in the same way as those shown in FIG. 6 will be designated at the same reference numerals as used in FIG. 6.

The computer 46 includes, in addition to the sections (software) for creating an input profile and an output profile, a multi-spectral image shooting section 47 for capturing images by the multi-spectral camera 41, a lighting data measurement section 48 for controlling the spectrometers 42 and 43 to obtain lighting data used for creating the input profile 4a, a monitor measurement section 49 for controlling the chromaticity meter 45 to obtain monitor data used for creating the output profile 5a, and a color reproduced image display section 50 for displaying a color reproduced image on the monitor 44.

Such an arrangement requires to create the input and output profiles prior to a color reproduced image producing process.

In creating an input profile, shooting-time and observation-time lighting spectral data are measured using spectrometers 42 and 43. Each of reference plates 51 and 52 used for measurement is simply a plate whose spectral reflectance is already known in order to get exact lighting spectral data. It is preferable to use a plate, such as a standard white plate, that has constant and high spectral reflectance, and little changes in characteristics with the passage of time. Although, in FIG. 9, there are illustrated an electric light bulb as a shooting light source and a fluorescent lamp as an observation light source, light sources of the same type may be used. Measurement may be made using sunlight as opposed to artificial light.

The shooting characteristics of the multi-spectral camera 41 calculated from the lighting data measured by the lighting data measurement section 48, and the subject characteristics are entered into the input profile creation section 6 to create an input profile 4a. The created input profile may be stored on a memory or disk not shown, in which case it will be read into the computer when it is needed.

The output profile 5a can be created by displaying appropriate colors on the monitor 44 and measuring them with the chromaticity meter 45. More specifically, the chromaticity values of the phosphors of the monitor 44 and a relationship between digital values for RGB signals input to the monitor and actual brightness value (generally known as gamma characteristic) are calculated.

The output profile 5a is created by the output profile creation section 10 on the basis of data measured by the monitor measurement section 49. Like the input profile 4a, the created output profile 5a is stored on a memory or disk and read into the computer when needed.

In this embodiment, a chromaticity meter is provided for monitor measurement; otherwise, the spectrometer for measuring lighting may be used as a chromaticity meter as well.

To produce a color reproduced image of a subject, the subject 53 is shot by the multi-spectral camera 41 and the resultant subject image is operated on by the input profile 4a and the output profile 5a in sequence to produce an image that suits the characteristics of the monitor 44. The multi-spectral camera may be either a multi-spectral camera that has a rotating color filter composed of a plurality of band-pass filters or a multi-spectral camera that uses a transmitted wavelength-variable filter.

When the input profile 4a is so designed as to process three-dimensional data, a normal RGB camera or digital camera can also be used.

In the present embodiment, the color reproduction device is implemented by a single personal computer. A color reproduction device or system can also be implemented which transmits accurately colors among multiple personal computers connected to a network.

Hereinafter, an example of an algorithm for. software processing will be described. First, let an output signal of the multi-spectral camera be denoted by gi. Then, gi is represented by $$gi = \int e_m(\lambda) \cdot f(\lambda) \cdot h_i(\lambda) \cdot d\lambda \tag{1}$$

where em($\lambda$) is the spectrum of shooting lighting, f($\lambda$) is the spectral reflectance, and hi($\lambda$) is the multi-spectral camera sensitivity when filter i is used. Actually, the tristimulus values, X, Y, Z, when a subject is observed by human are given by $$X = \int e_0(\lambda) \cdot f(\lambda) \cdot x(\lambda) \cdot d\lambda$$
$$Y = \int e_0(\lambda) \cdot f(\lambda) \cdot y(\lambda) \cdot d\lambda \tag{2}$$
$$Z = \int e_0(\lambda) \cdot f(\lambda) \cdot z(\lambda) \cdot d\lambda$$

where $e_0(\lambda)$ is the lighting spectrum at the time of observation, f($\lambda$) is the spectral reflectance of the subject, and x($\lambda$), y($\lambda$), and z($\lambda$) are each an isochromatic function. A matrix M is then calculated to satisfy $$M \cdot g = [X, Y, Z]^t \tag{3}$$

where t represents the transpose of a matrix.

An evaluation function designs M so as to minimize $$e^2 = E[(X - M \cdot g)^2] \tag{4}$$

where E[ ] represents an operator for seeking an expected value.

M sought as $$\partial e^2 / \partial M = 0 \tag{5}$$

is the least square filter given by $$M = A \cdot B^{-1}$$
$$A_{ij} = \int \int e_0(\lambda) \cdot x_i(\lambda) \cdot E[f(\lambda) \cdot f(\lambda')] \cdot e_m(\lambda') \cdot h_j(\lambda') \cdot d\lambda \cdot d\lambda'$$
$$B_{ij} = \int \int e_m(\lambda) \cdot h_i(\lambda) \cdot E[f(\lambda) \cdot f(\lambda')] \cdot e_m(\lambda') \cdot h_j(\lambda') \cdot d\lambda \cdot d\lambda' \tag{6}$$

E[f($\lambda$)·f($\lambda'$)] in equation (6) represents a spectral correlation term of the subject to be measured. To minimize the evaluation function for every possible objects, spectral correlation term will be a unit matrix. Therefore matrix M is given by $$M = A \cdot B^{-1}$$
$$A_{ij} = \int e_0(\lambda) \cdot x_i(\lambda) \cdot e_m(\lambda) \cdot h_j(\lambda) \cdot d\lambda \tag{7}$$
$$B_{ij} = \int e_m(\lambda)^2 \cdot h_i(\lambda) \cdot h_j(\lambda) \cdot d\lambda$$

If some restrictions are imposed on subjects to be reproduce, and the spectral reflectance of the subject can be represented by some principle components, colors can be estimated with accuracy even from a small number of spectral images. For example, in the field of remote medical systems, when the spectral reflectance of skin is measured and a correlation matrix is then calculated as the statistical nature, the skin color can be reproduced with accuracy from a small number of spectral images.

That is, for color reproduction processing using subject characteristics, the creation of an input profile corresponds to the calculation of equation (6). When no subject characteristics are used, the input profile creation corresponds to the calculation of equation (7). The input profile operation section multiplies signals obtained in the multi-spectral image shooting section by filter M, namely, calculates equation (3).

Next, a second embodiment of the color reproduction device of the present invention will be described.

Figure 10:
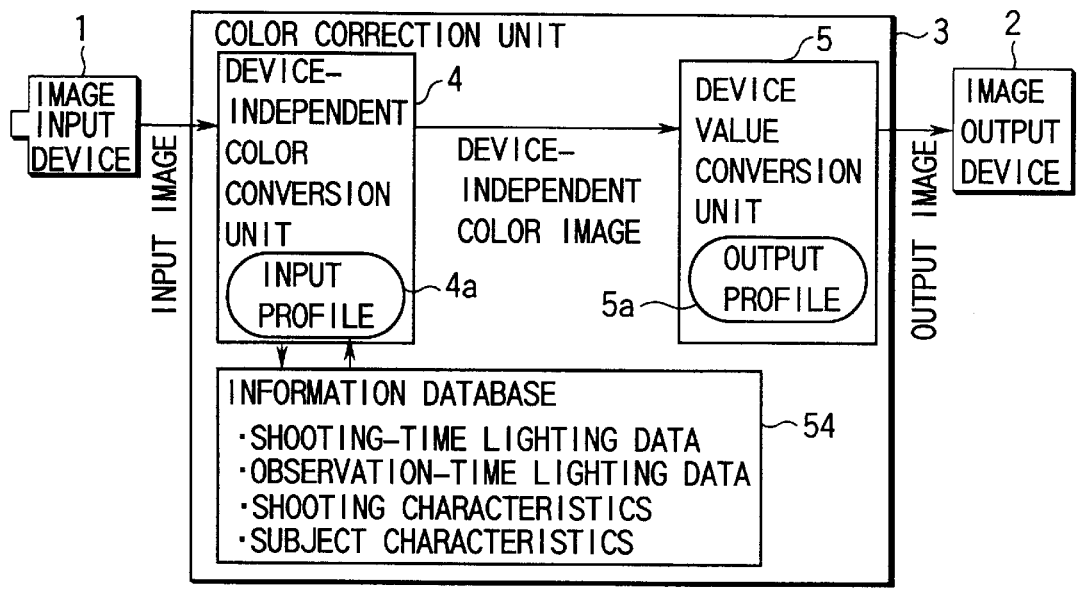
FIG. 10 is a schematic illustration of a second embodiment of the color reproduction device of the present invention.

As shown in FIG. 10, the second embodiment is constructed from an image input device 1, a device-independent color conversion unit 4, a device value conversion unit 5, an image output device 2, and an information database 54.

The device-independent color conversion unit 4 converts the image of a subject shot by the image input device 1 to a device-independent color image by referencing an input profile 4a. The device value conversion unit 5 converts the resulting device-independent color image to device values that suit the characteristics of the image output device 2 by referencing an output profile Sa, thereby producing an output image. The output image is outputted (displayed or printed) by the image output device 2. Such. image input device information and environmental information as described previously are entered into the database 54, thus allowing the image input device information or environmental information to be referenced freely at the time of creating the input profile.

Thus, in any environment an input image can be converted to a device-independent color images. The information database may be retained at the other end of the network, or on a storage medium, such as a CD-ROM, and, at the time of input profile creation, called for reference. An information database for information concerning the image output device may be provided for reference at the time of creating the output profile. Thus, a device-independent color image can be converted to an output image in any environment.

A third embodiment of the color reproduction device of the present invention will be described next with reference to FIGS. 11 and 12.

In the third embodiment, an input image itself has part of image input device information or environmental information needed to create an input profile, and color conversions are made on image data having a data structure that allows lighting conversion.

Figure 11:
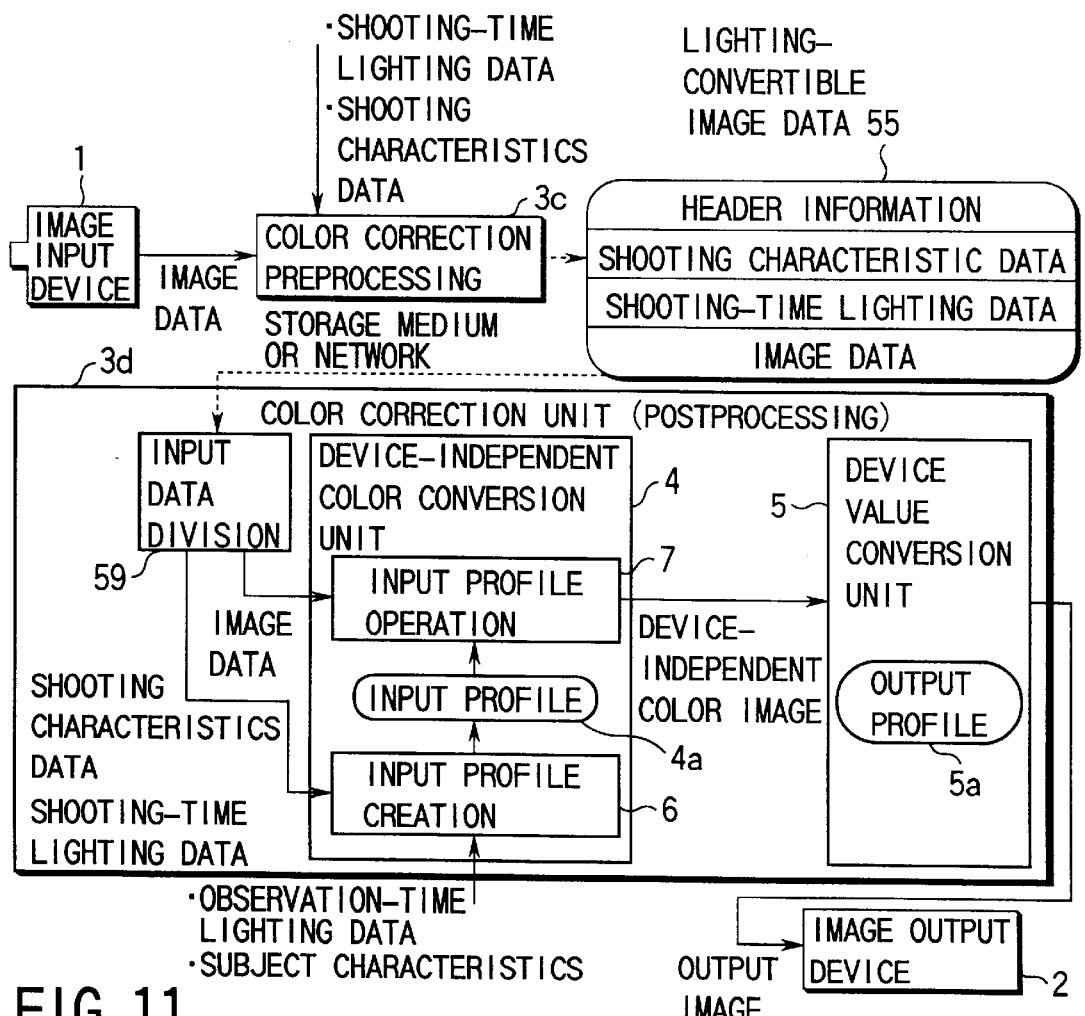
FIG. 11 is a diagram for use in explanation of lighting convertible image data which is inputted to a color correction unit of a device according to a third embodiment.

The third embodiment is constructed, as shown in FIG. 11, from an image input device 1, a color correction preprocessing unit 3c, a color correction unit 3d, and an image output device 2.

Upon receipt of an image of a subject shot by the image input device 1, color correction preprocessing unit 3c combines the input image data and various information necessary for creation of an input profile into an image format that allows color corrections on changes in color due to the effect of lighting, the image format being referred to as the lighting convertible image format. The color correction unit 3d causes input and output profiles to operate on the lighting convertible image data 55 from the preprocessing unit 3c to produce color-corrected image data, which, in turn, is outputted (displayed or printed) from the image output device 2.

The color correction unit 3d is composed of an, input data division unit 59, a device-independent color conversion unit 4, and a device value conversion unit 5.

The input data division unit 59 divides input lighting convertible image data 55 into image data and various information necessary for input profile creation, which are then applied to the device-independent color conversion unit 4. The conversion unit causes the input profile to operate on the image data to output a device-independent color image. The device value conversion unit 5 converts the device-independent color image to device values that match the characteristics of the output device by referencing the output profile.

The device-independent color conversion unit 4 comprises an input profile creation section 6 responsive to the image input device information and the environmental information for creating an input profile, and an input profile operation section 7 for causing the input profile to operate on the input image data for conversion to a device-independent color image.

Figure 12:
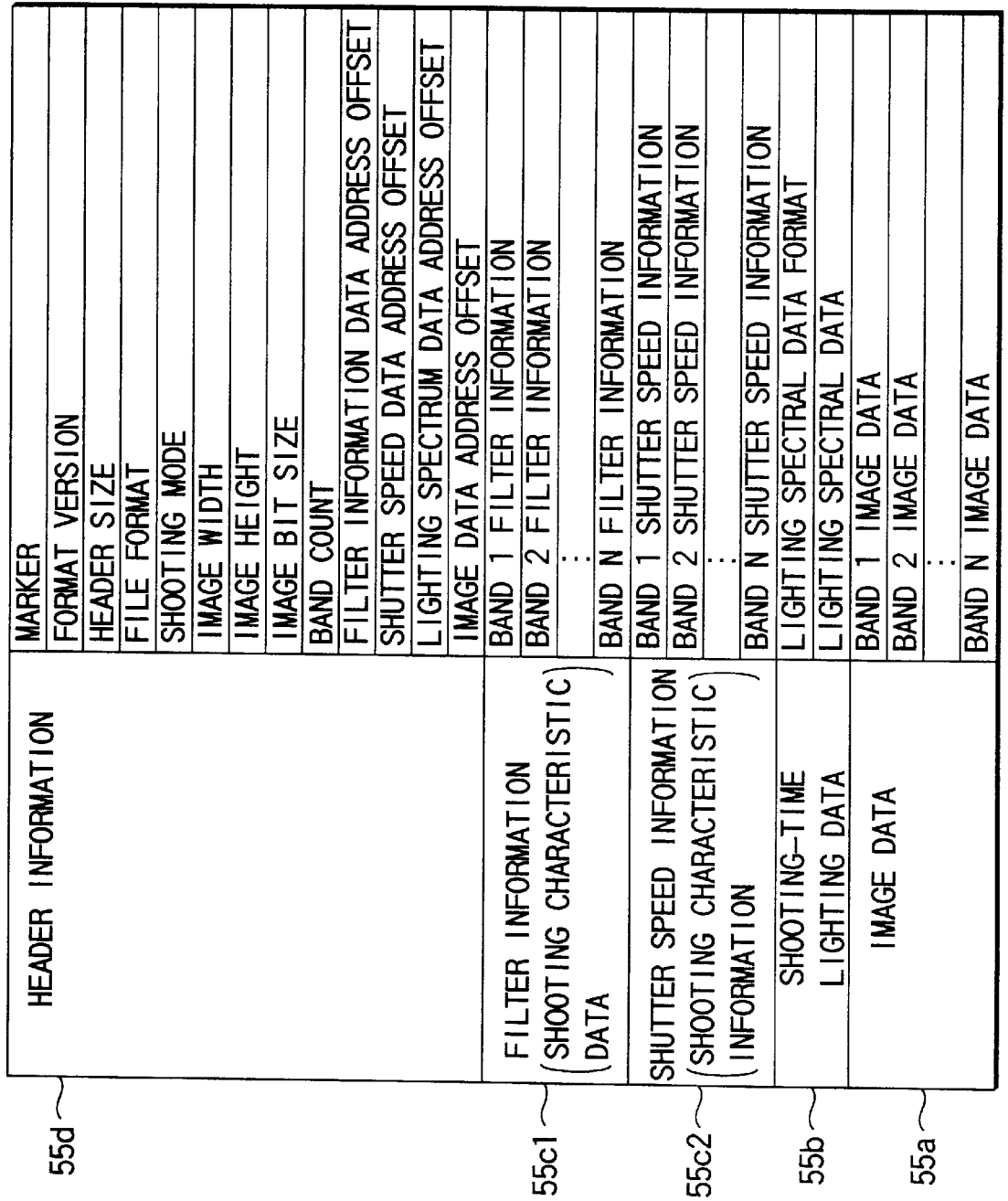
FIG. 12 shows a format of lighting convertible image data used in the third embodiment.

For example, as shown in FIG. 12, the lighting convertible image data 55 comprises image data 55a, a plurality of images assigned to band numbers, shooting-time lighting data 55b as environmental information, filter information 55c1 and shutter speed information 55c2 used in the image input device as image input device information, and header information 55d.

In this arrangement, image data itself inputted to the device-independent color conversion section 4 contains part of the image input device information and environmental information. Image input device information and environmental information which are not contained in the input image data are externally applied to the conversion section 4 as in the previous embodiments.

Therefore, by combining image data and part of image input device information and environmental information in the color correction preprocessing section 3c into a single data structure, data can be obtained which allows observation-time lighting to be changed freely. Such an arrangement as shown in FIG. 8 may be used in place of the device-independent color conversion section 4 and the device value conversion section 5.

Figures 13, 14:
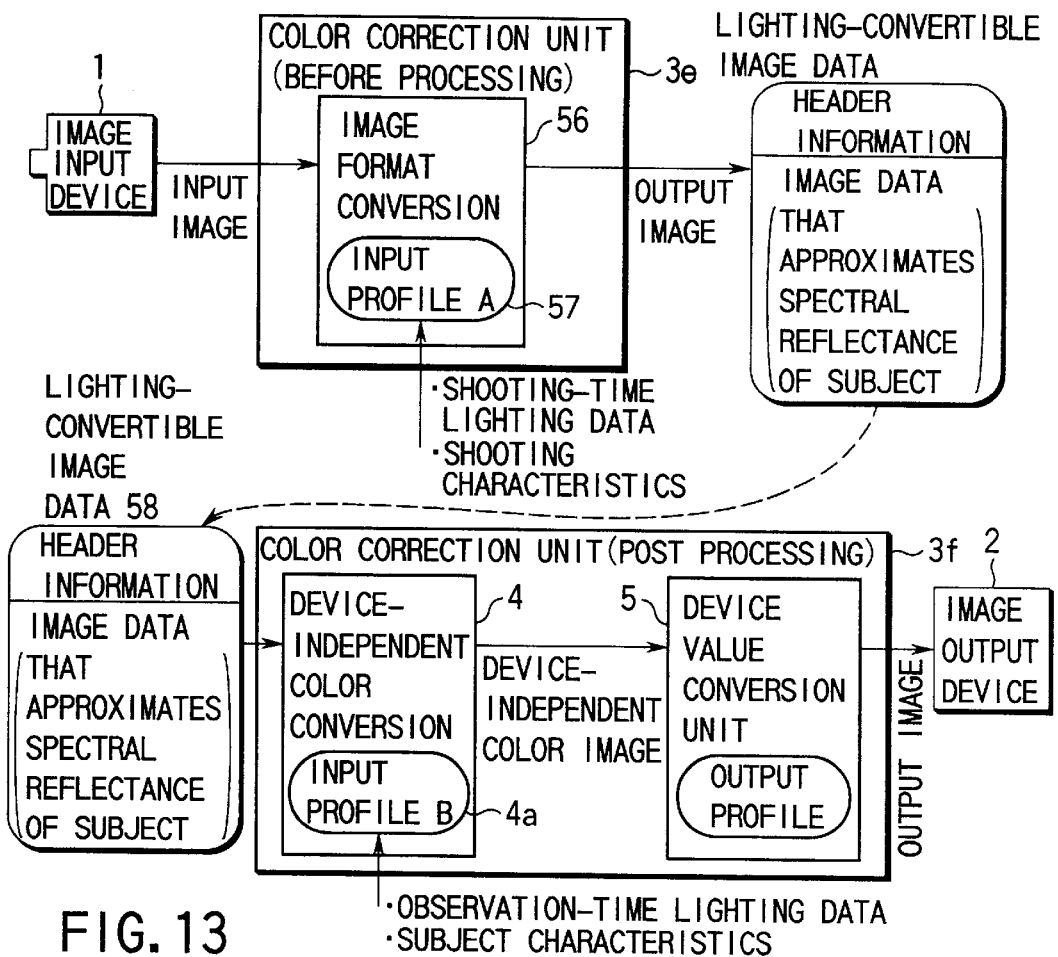
FIG. 13 shows a modification of the third embodiment.
FIG. 14 shows a format of lighting convertible image data used in the modification of the third embodiment.

FIGS. 13 and 14 show a modification of the third embodiment.

In this modification, the color correction section shown in FIG. 7 is separated into a preprocessing section and a postprocessing section. Between the preprocessing and postprocessing sections, image data is converted into an image data format (this is also the lighting convertible image format) that approximates the spectral reflectance of a subject for subsequent movement or transmission.

This modification is constructed from an image input device for shooting a subject to produce a subject image, a color correction preprocessing section 3e having an image format conversion section 56 for converting the input image into image data (lighting convertible image) that approximates the spectral reflectance of the subject by referencing an input profile A 57 and adding header information to the image data, a color correction section 3f having a device-independent color image conversion section 4 for converting lighting convertible image data 58 comprising the image data and the header information into a device-independent color image by referencing an input profile B 4a and a device value conversion section 5 for converting the resulting device-independent color image to device values that match the characteristics of the image output device 2 by referencing an output profile 5a to provide an output image, and an image output device 3 for outputting (displaying or printing) the output image.

This color reproduction device is characterized by converting the format of an input image so as to contain shooting characteristics and shooting-time lighting data to thereby provide a lighting convertible data structure that approximates the spectral reflectance of a subject.

As an example of lighting convertible image data 58 represented by the lighting convertible image format, there is illustrated in FIG. 14 a format of image data representing the spectral reflectance of a subject.

By converting an input image to image data containing shooting characteristics and shooting-time lighting data (image data approximating the spectral reflectance of a subject) in the color correction preprocessing section 3e, this modifications allows data quantity to be reduced as compared with the image data format of FIG. 11 in the third embodiment, thus: increasing the processing speed.

Next, specific arrangements of the third embodiment will be described.

Figure 15:
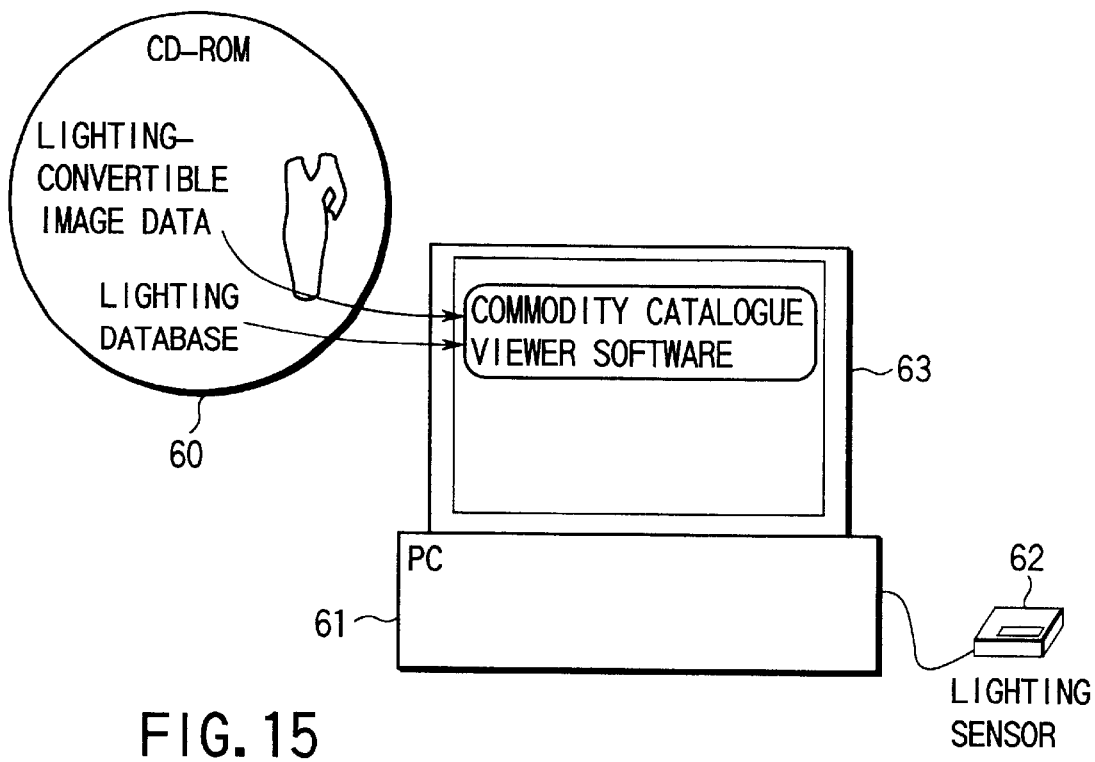
FIG. 15 shows, in appearance form, a first specific application of the device according to the third embodiment.
Figure 16:
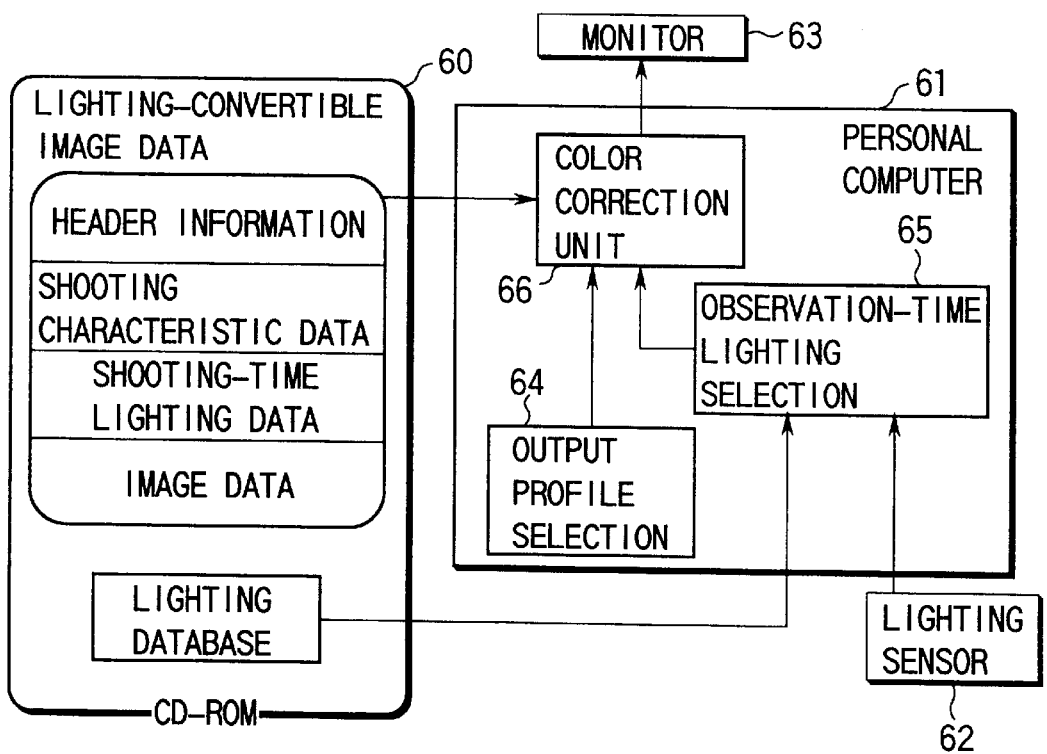
FIG. 16 shows, in block diagram form, an arrangement of the device of FIG. 15.

FIGS. 15 and 16 show a first specific arrangement of the third embodiment.

To confirm color samples of a commodity using a. personal computer, this arrangement employs a storage medium that is recorded with image data pertaining to the commodity in a data format that allows changes in lighting and a database for various lighting data.

For example, on a CD-ROM 60 as the storage medium are retained commodity catalog viewer software, a lighting database that contains information concerning lighting assumed to be installed in a place to view::the commodity, and image data pertaining to the commodity (lighting convertible image data).

The arrangement comprises the CD-ROM 60 recorded with the commodity catalog viewer software, the lighting database, and image data pertaining to the commodity in a data format allowing lighting changes, a personal computer 61 that runs the commodity catalogue viewer software, a lighting sensor 62 that detects lighting in the place where the personal computer is installed, and a monitor 63 for displaying an image from the personal computer.

The personal computer 61 contains an output profile select section 64 that selects a suitable one out of a plurality of output profiles which have been set up in advance, an observation lighting select section 65 responsive to the lighting database and a detected signal from the lighting sensor 62 for selectively outputting data necessary for color correction, and a color correction section 66 that makes color corrections on the image data of the subject by referencing input and output profiles to provide an output image to the monitor. The arrangement further includes a hard disk, a ROM, a RAM, and so on, which are needed to run the viewer software.

The input profile may be created in the color correction section from the image data and data from the lighting database. Alternatively, the input profile may have been created in advance and stored in a memory.

In this arrangement, the user loads the CD-ROM 60 into the personal computer 61, activates the commodity catalog viewer software, and displays the commodity catalog. At this point, lighting data is also retrieved from the lighting database. Thus, the user can view how the commodity changes in color if it were placed under fluorescent lamp, incandescent lamp, or sunlight, and so on. Further, by attaching a lighting sensor to the personal computer, it is also possible to reproduce the color of the commodity in the place where the personal computer is installed. In addition, an object movie that allows an image to be viewed from various angles and image data that allows changes in lighting (lighting convertible image data) may be used in combination.

In this embodiment, a storage medium is used to provide image data; otherwise, the Internet may be used. The commodity is not limited to clothing. This embodiment is also effective in confirming the colors of cosmetics, furniture, electrical appliances, pictures, and so on.

Next, a second specific example of the third embodiment will be described with reference to FIGS. 17, 18 and 19.

Figure 17:
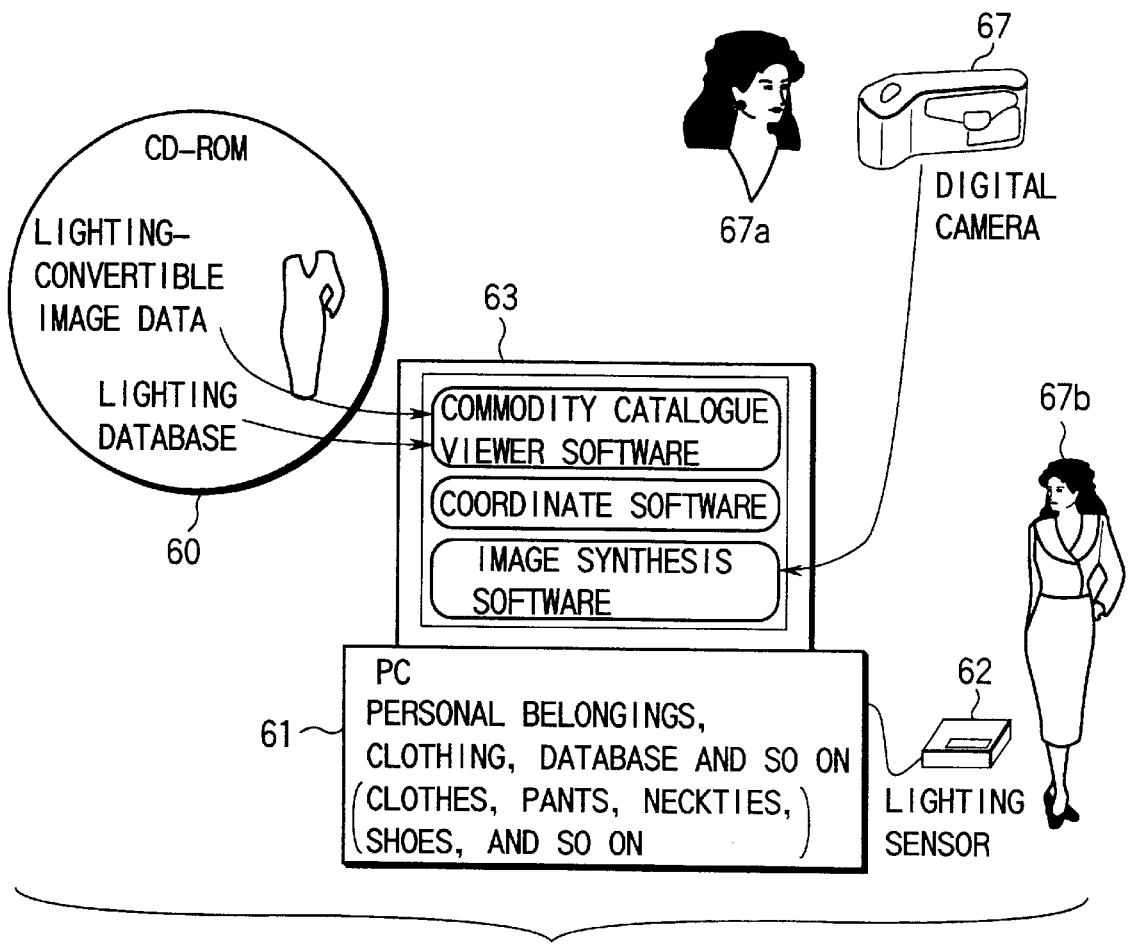
FIG. 17 shows, in appearance form, a second specific application of the device according to the third embodiment.

As shown in FIG. 17, this arrangement includes a digital camera in addition to the components of FIGS. 15 and 16. An image captured by the digital camera is fit into image data pertaining to a commodity read from the CD-ROM and the user changes lighting freely.

Figure 18:
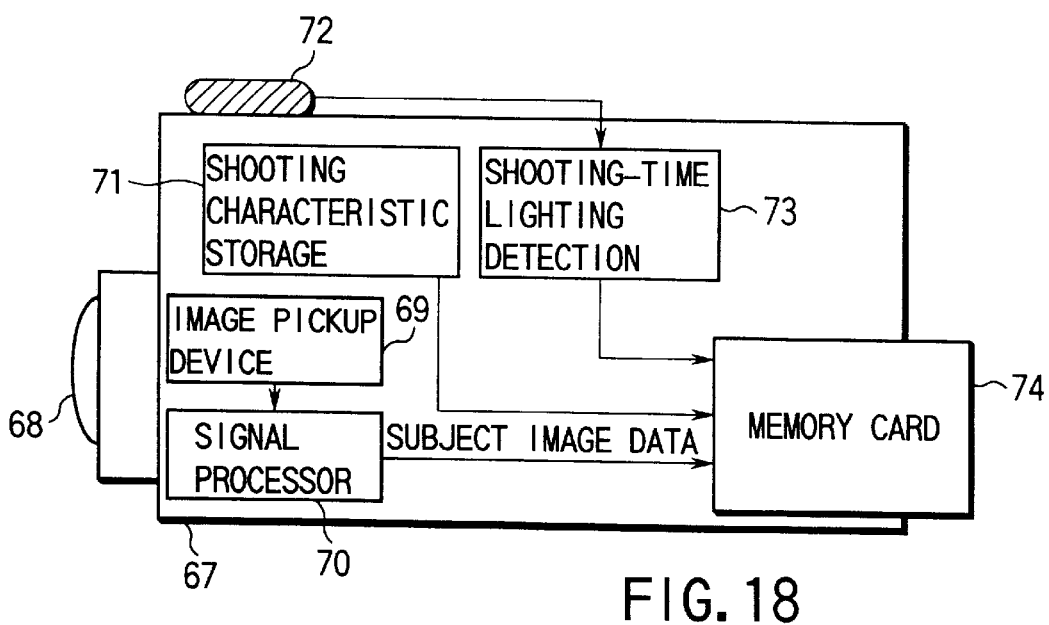
FIG. 18 shows, in block diagram form, an arrangement of the digital camera of FIG. 17.
Figure 19:
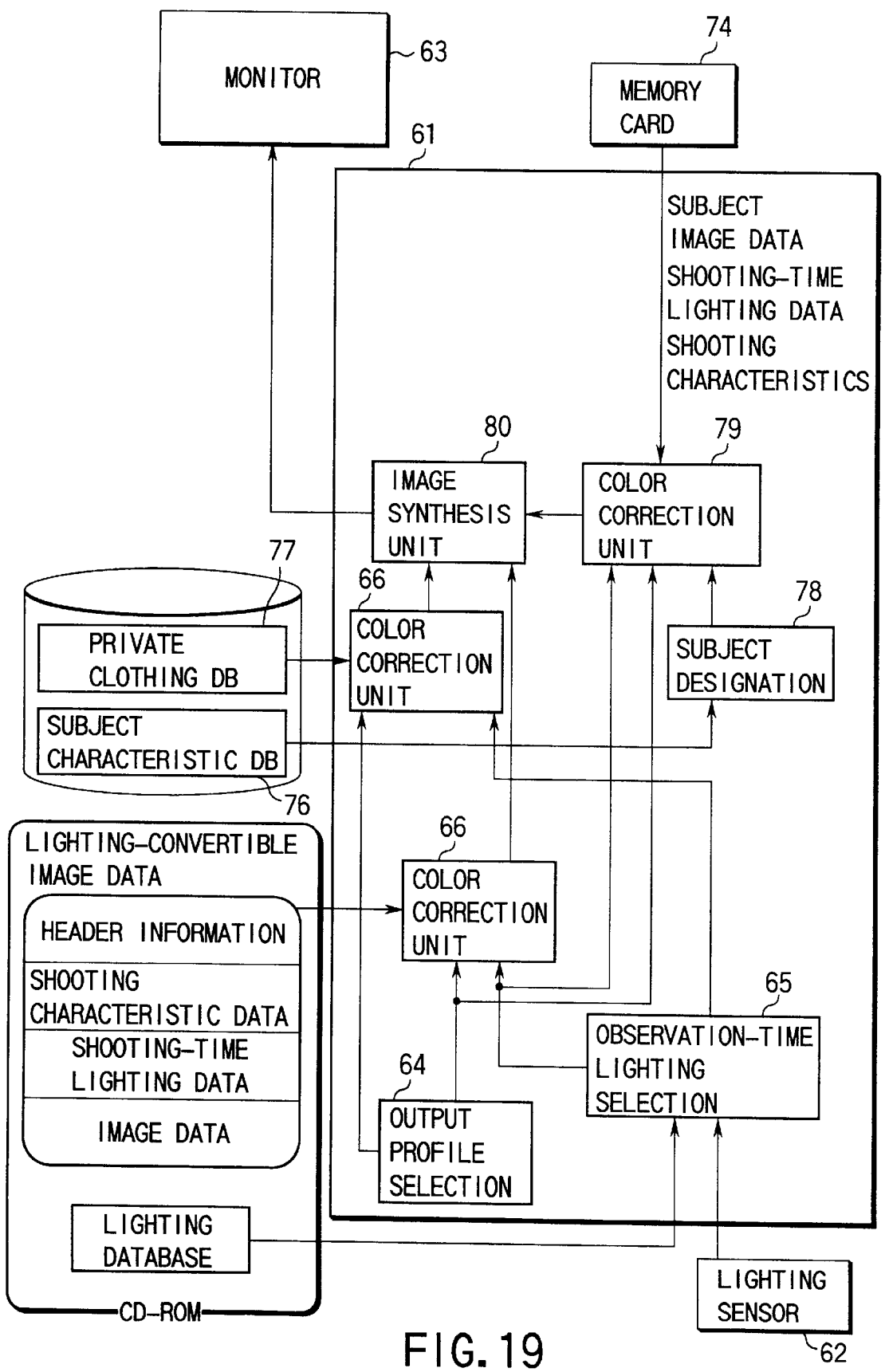
FIG. 19 shows, in block diagram form, an arrangement of the device of FIG. 17.

The digital camera 67 is constructed, as shown in FIG. 18, from a lens 68, an image pickup device 69 for converting an image obtained through the photoelectric effect into electrical signals, a signal processing unit 70 for processing image information consisting of the electrical signals, a shooting characteristic storage unit 71 for storing the shooting characteristics of the camera, a lighting sensor 72 for detecting the lighting at a shooting site, a shooting-time lighting data detect unit 73 for processing a detected signal from the sensor, and a memory card 74 for storing the subject image data, the shooting characteristics, and the shooting-time lighting data. The memory card is removably attached to the camera.

The color reproduction device is constructed from the CD-ROM 60 recorded with the commodity catalog viewer software, the lighting database, and lighting convertible image data, the personal computer 61 for running the viewer software, the lighting sensor 62 for detecting the lighting at the personal computer installation, the memory card 74 recorded with image data captured by the digital camera 67, a subject characteristic database 76 for storing subject characteristic, and a private clothing database 77. The databases 76 and 77 are retained on a hard disk.

The personal computer 61 includes, in addition to the components in the first specific arrangement, a subject designation section 78 for designating data corresponding to a subject in the subject characteristic database 76, a color correction section 79 for making color corrections on subject image data read from the memory card in accordance with shooting-time lighting data and shooting characteristics which are also read from the memory card, and an image combining section 80 for combining independently color-correctled images.

In the color reproduction device thus arranged, when the commodity catalog viewer software is activated to display clothes, a portrait (67a) of the user shot by the digital camera 67 and the image of clothing can be combined (67b).

User can construct clothing database 77, which has image data of clothes user owned. Using coordinate software together, user can simulate coordination of clothes when user bought the new cloth in catalog.

In this embodiment, a storage medium is used to provide image data; instead, the Internet may be used. The commodity is not limited to clothing. This embodiment is also effective in confirming the colors of cosmetics, furniture, electrical appliances, pictures, and so on.

Next, a fourth embodiment of the color reproduction device of the present invention will be described.

This embodiment comprises an image input device capable of determining part of environmental characteristics at the same time a subject is shot, color correction unit 3, and an image output device 2.

Figure 20:
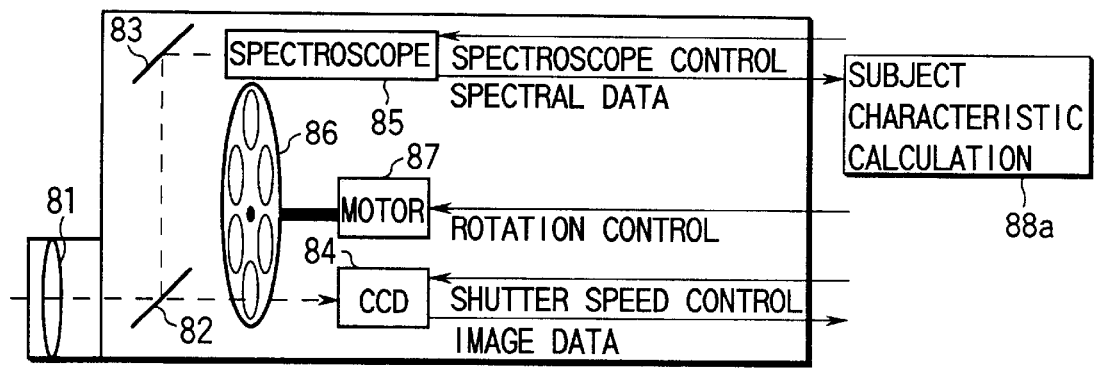
FIG. 20 shows an arrangement of a multi-spectral camera used in a fourth embodiment of the color reproduction device of the present invention.

In FIG. 20 there is illustrated the arrangement of a multi-spectral camera that captures an image of a subject and part of environmental information at the same time.

In this arrangement, a beam of light collected, by an objective lens 81 is split by a beam splitter 82 into tow beams: one is directed onto a CCD 84 and the other is reflected by a mirror 83 onto a spectrometer 85.

The multi-spectral camera captures a plurality of spectral images while rotating a turret 86, having a plurality of bandpass filters by means of a motor 87.

While the spectral images are captured, the spectrometer 85 measures the spectrum of a certain spot on the subject a plurality of times to obtain the statistical nature of the spectrum of the subject, which is sent to a subject characteristic calculation unit 88b. That is, the image data and the subject characteristics of the environmental information can be captured simultaneously.

Figure 21:
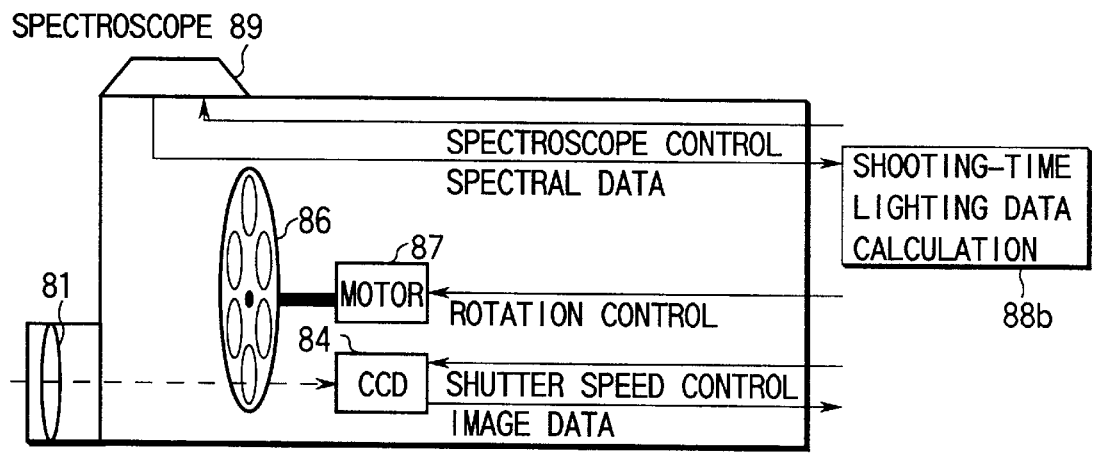
FIG. 21 shows a second arrangement of the multi-spectral camera used in the fourth embodiment of the color reproduction device of the present invention.
Figure 22:
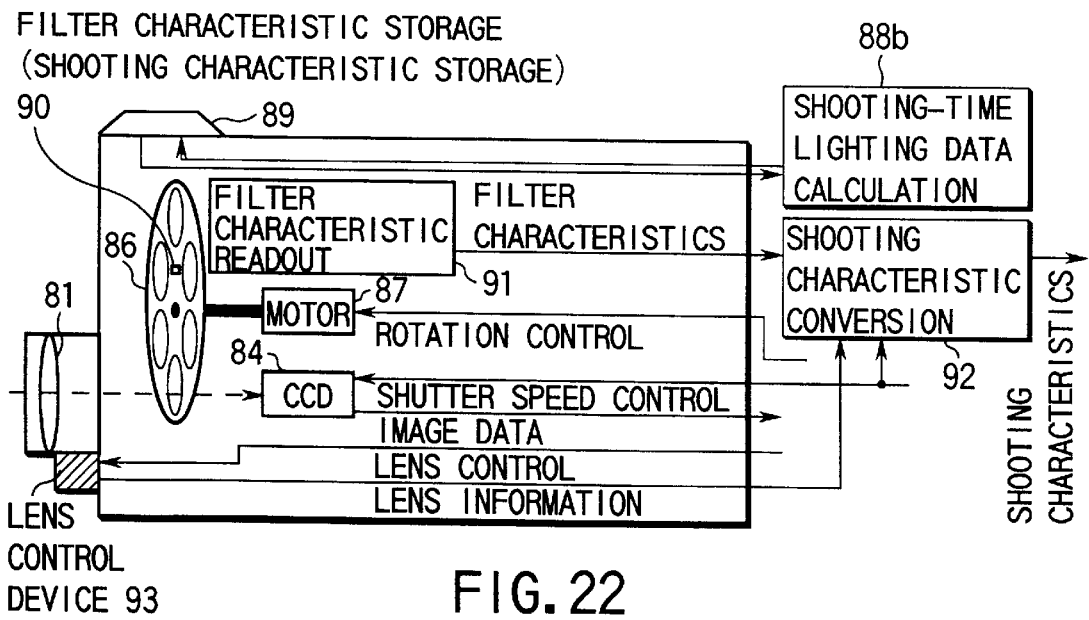
FIG. 22 shows an arrangement of a multi-spectral camera used in a fifth embodiment of the color reproduction device of the present invention.

FIG. 22 shows a modification of the camera shown in FIG. 21.

In this camera, a spectrometer 59 is placed on top of the camera. A shooting-time lighting data calculation unit 88b calculates shooting-time lighting data from spectral data obtained by the spectrometer 59. That is, according to this type of camera, image data and shooting-time lighting data, which is part of environmental information, can be captured at the same time.

In this embodiment, use may be made of a multi-spectral camera using a plurality of bandpass filters, a multi-spectral camera using a variable-wavelength filter made of liquid crystal, a multi-spectral camera in which the optical path of a beam of light is divided by means of a prism, or a digital camera.

A fifth embodiment of the color reproduction device of the present invention will be described hereinafter.

This embodiment is constructed from an image input device 1, a device-independent color conversion unit 4, a device value conversion unit 5, and an image output device 2, which remain unchanged from those described so far.

The device-independent color conversion unit 4 converts an input image into a device-independent color image by referencing an input profile 4a, and the device value conversion unit 5 converts the device-independent color image to device values that match the characteristics of the image output device by referencing an output profile 5a. An output image is outputted (displayed or printed) by the image output device.

The image input device 1 that captures the image of a subject is equipped with a shooting information storage unit that stores all or part of image input device information, which can be referenced freely at the time of color correction.

In FIG. 22 there is illustrated a multi-spectral camera that serves as the image input device 1.

The multi-spectral camera is constructed from an objective lens 81, a lens controller 93 for drive controlling the lens, an image pickup device (CCD) 84, a rotating filter turret 86 comprising a plurality of bandpass filters used in capturing images in different wavelength bands, a motor 87 for rotating the filter turret 86, a filter characteristic storage unit (shooting characteristic storage unit) 90, provided for each filter turret, for storing the characteristics of the filters mounted, a filter characteristic read unit 91 for reading the filter characteristics, and a shooting characteristic converting section 92 for converting lens information, shutter speed control and filter characteristics to shooting characteristics.

The filter characteristics are read into the filter characteristic read unit 91 each time the characteristics of filters mounted on the filter turret 86 or the filter turret is exchanged.

Information concerning the objective lens 81 is read from the lens controller 93. The filter characteristic information and the lens information are converted into shooting characteristic data in the shooting characteristic conversion unit 92, which, in turn, is sent to the color reproduction device. Data to be stored in the camera may contain the spectral sensitivity characteristics of the CCD 84.

The camera used in this embodiment may be a multi-spectral camera using a plurality of bandpass filters, a multi-spectral camera using a variable-wavelength filter made of liquid crystal, a multi-spectral camera in which the optical path of a beam of light is divided by means of a prism, or a digital camera.

A sixth embodiment of the color reproduction device of the present invention will be described next.

The sixth embodiment is the same as the arrangement shown in FIG. 1 except the device value conversion unit 5.

Figure 23:
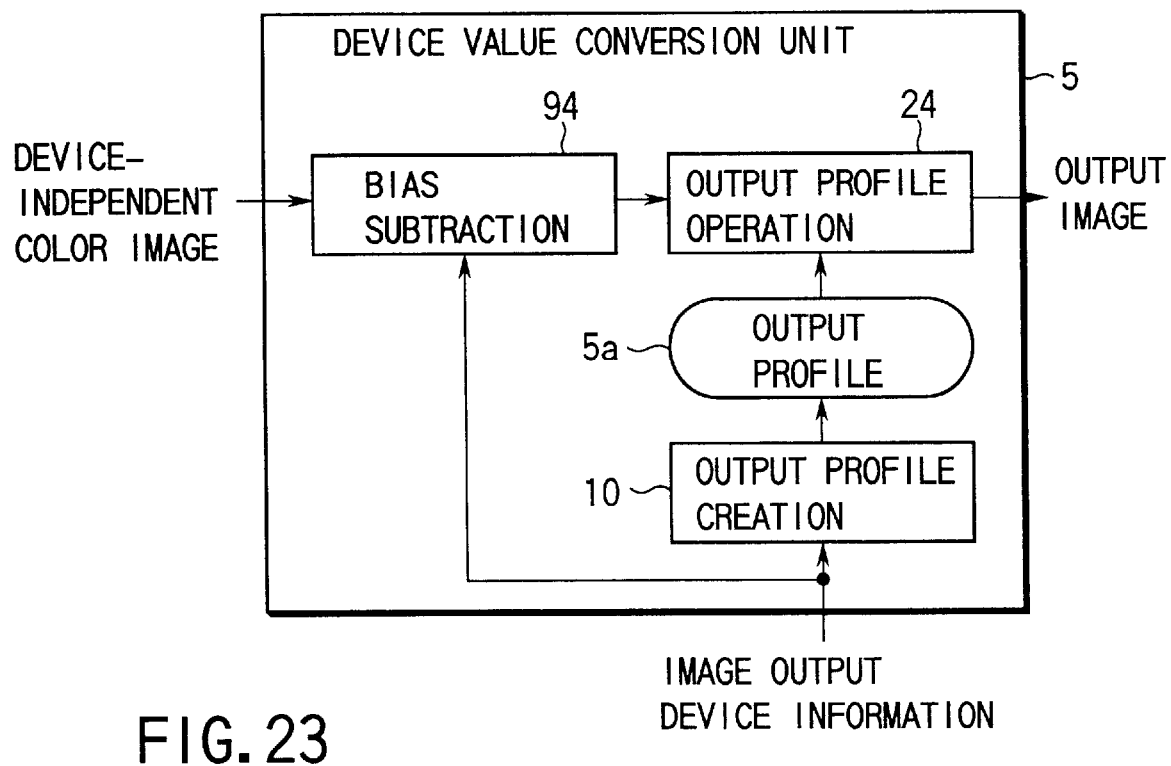
FIG. 23 shows an arrangement of the device value conversion unit in a sixth embodiment of the color reproduction device of the present invention.

As shown in FIG. 23, the device value conversion section 5 comprises an output profile creation section 10 for creating an output profile 5a in accordance with input image output device information, an offset subtraction section 94 for subtracting offset from an input device-independent color image, and an output profile operation section 24 for performing a color conversion process on the output of the offset subtraction section by referencing the output profile 5a.

Usually, offset light and environment light are added to an image being displayed.

$$\begin{pmatrix} X \\ Y \\ Z \end{pmatrix} = \begin{pmatrix} Xr\,max & Xg\,max & Xb\,max \\ Yr\,max & Yg\,max & Yb\,max \\ Zr\,max & Zg\,max & Zb\,max \end{pmatrix} \begin{pmatrix} \gamma r[R] \\ \gamma g[G] \\ \gamma b[B] \end{pmatrix} + \begin{pmatrix} X_0 \\ Y_0 \\ Z_0 \end{pmatrix} \quad (8)$$

As can be seen from equation (8), the resulting X, Y, or Z value is represented by the corresponding RGB values plus a bias value (X0, Y0, or Z0).

Thus, only the bias values related to offset light and environment light are measured and the bias values are subtracted from XYZ values inputted to the profile. This process allows an output profile sought in dark room to be used as it is; thus, much work is not needed to create an profile. Specifically, matrix transform $$\begin{pmatrix} R' \\ G' \\ B' \end{pmatrix} = \begin{pmatrix} Xr\,max & Xg\,max & Xb\,max \\ Yr\,max & Yg\,max & Yb\,max \\ Zr\,max & Zg\,max & Zb\,max \end{pmatrix}^{-1} \begin{pmatrix} X - X_0 \\ Y - Y_0 \\ Z - Z_0 \end{pmatrix} \quad (9)$$

$$\text{gamma correction} \quad \begin{aligned} R &= \gamma r^{-1}[R'] \\ G &= \gamma g^{-1}[G'] \\ B &= \gamma b^{-1}[B'] \end{aligned}$$

As indicated in this equation, it is only required to subtract the bias values (X0, Y0, Z0) from colors to be displayed before the output profile is operated on.

A seventh embodiment of the color reproduction device of the present invention will be described next.

Usually, monitor offset light and environment light are measured separately or simultaneously and then subtracted from XYZ values to be displayed. Let XYZ values associated with monitor offset light be denoted by Ox, Oy, and Oz, and XYZ values associated with environment light be denoted by Lx, Ly, and Lz. Then, bias values X0, Y0, and Z0 are given by $$X_0 = O_x + L_x$$
$$Y_0 = O_y + L_y \quad (10)$$
$$Z_0 = O_z + L_z$$

Figure 24:
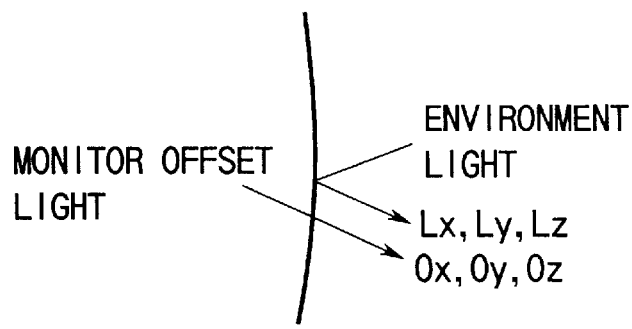
FIG. 24 is a conceptual diagram of the monitor screen in a seventh embodiment of the color reproduction device of the present invention.

FIG. 24 is a conceptual diagram of the monitor screen surface.

Figure 25A:
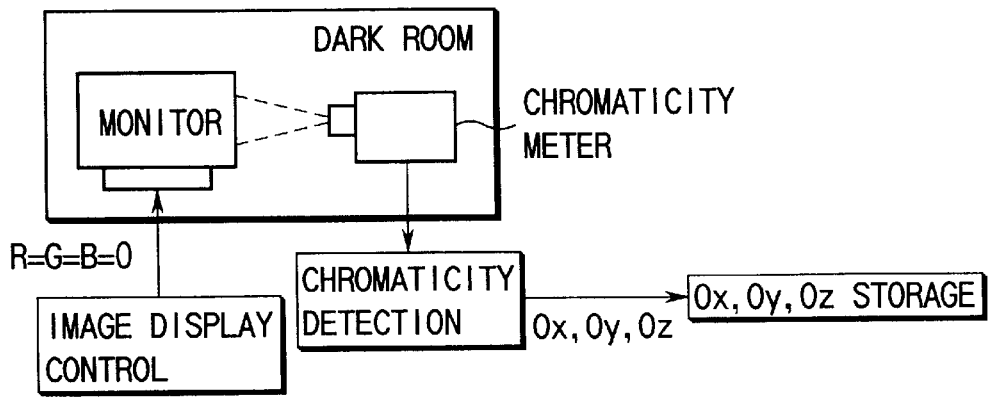
FIGS. 25A, 25B and 25C shows the measurements of bias values using a chromaticity meter in different environments in the seventh embodiment.
Figure 25B:
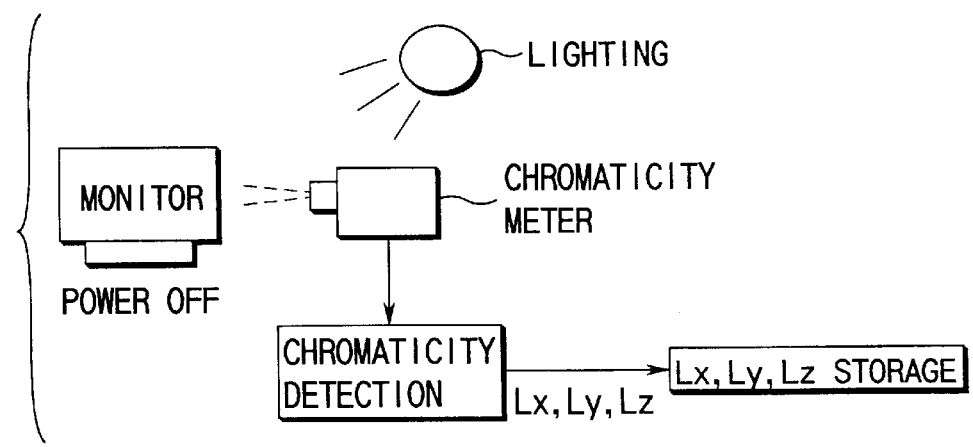
Figure 25C:
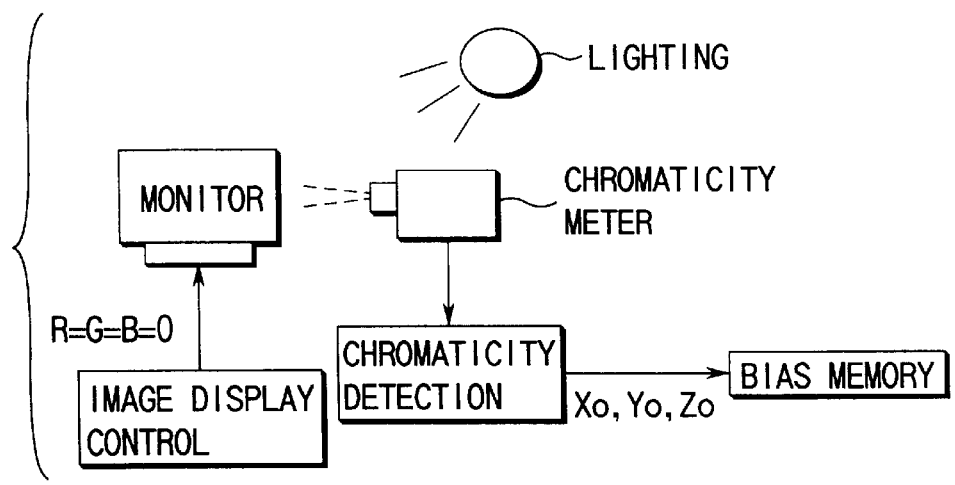

FIGS. 25A, 25B and 25C illustrate arrangements for measuring bias values using a chromaticity meter.

In the arrangement of FIG. 25A, to measure the XYZ values, Ox, Oy, Oz, associated with monitor offset light, a monitor and a chromaticity meter are installed in a dark room and chromaticity values are detected with the power to the monitor turned on and monitor inputs set such that R=G=B=0. In FIG. 25B, XYZ values, Lx, Ly, Lz, associated with environment light are measured. In FIG. 25C, bias values X0, Y0 and Z0 are measured directly.

Figure 26:
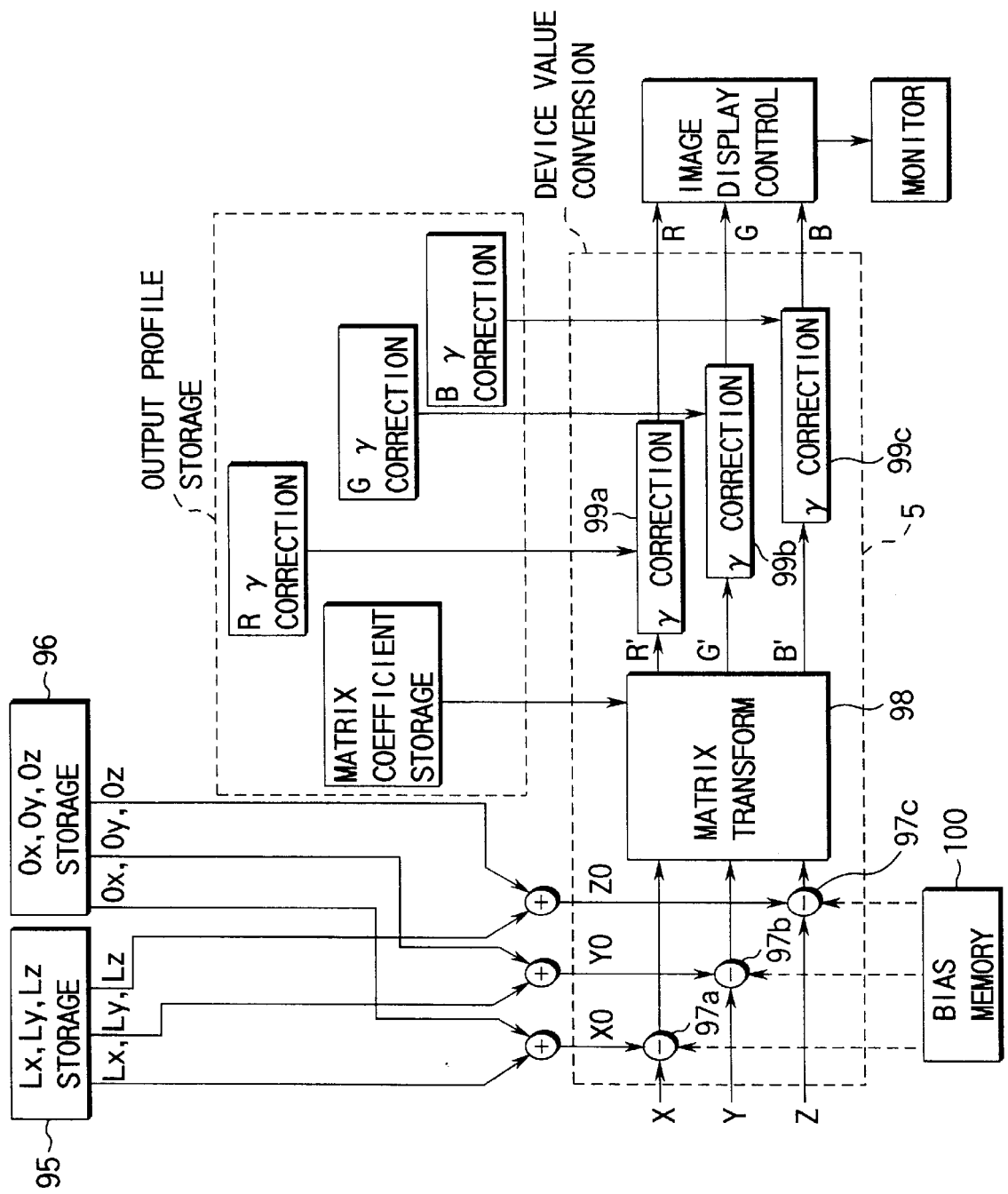
FIG. 26 shows an arrangement of the device value conversion unit in the seventh embodiment of the color reproduction device of the present invention.

FIG. 26 shows the arrangement of the device value conversion unit of FIG. 23 and its peripheral units.

The device value conversion unit 5 is constructed from subtracters 97a, 79b, and 79c, a matrix transform section 98, and gamma correction sections 99a, 99b, and 99c.

Figure 36:
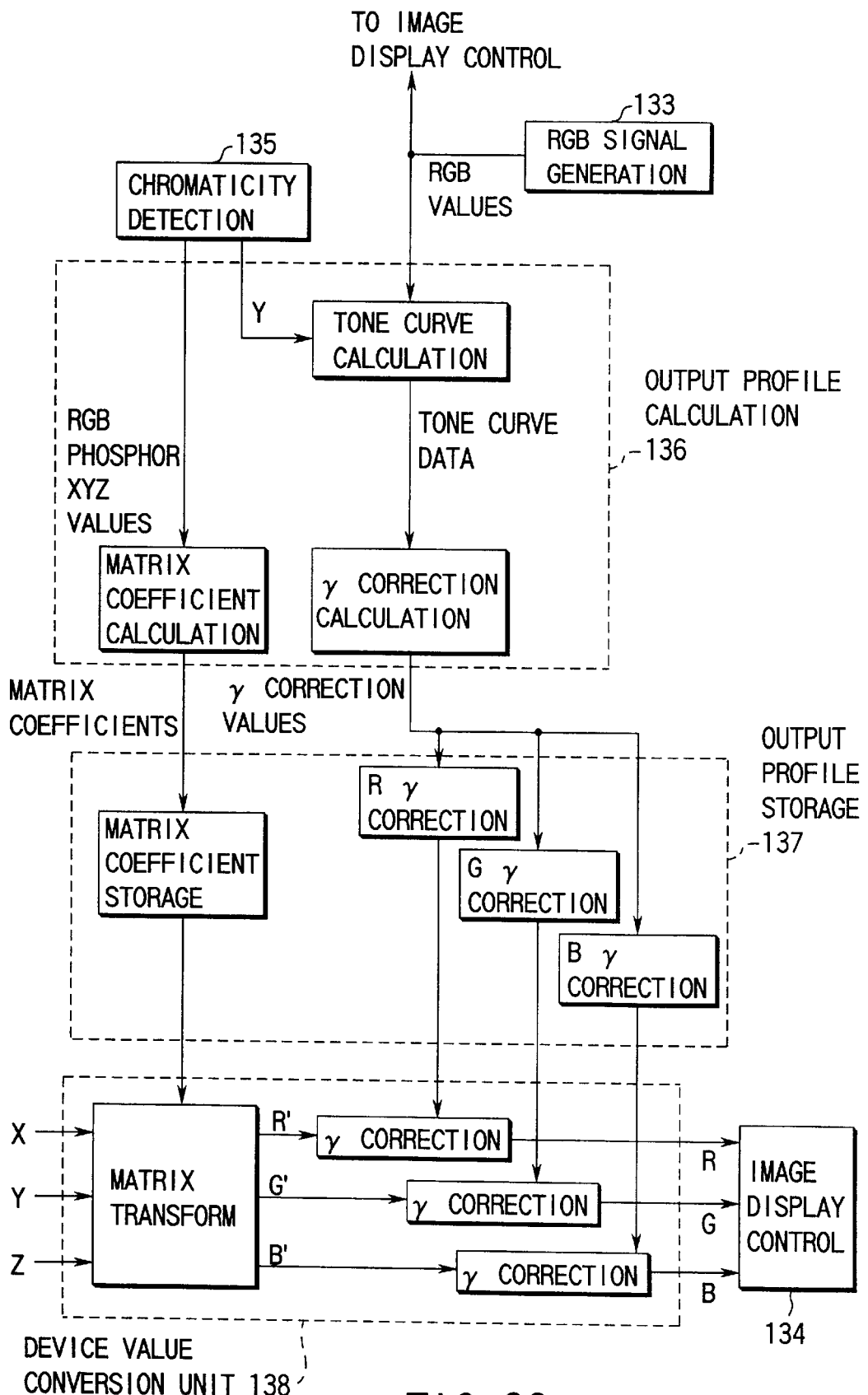
FIG. 36 shows an arrangement for performing a sequence of processes of matrix transform and gamma correction in the color correction unit in the conventional color reproduction device.

The subtracters 97a, 79b, 79c subtract bias values X0, Y0, and Z0 from input values X, Y, and Z, respectively. The bias values X0, Y0 and Z0 are represented by equation (10) on the basis of Lz, Ly and Lx values from storage 95 and Ox, Oy, and Oz values from storage 96. The matrix transform section 98 performs matrix transformation on the resulting X, Y, and Z values using matrix coefficients read from coefficient storage in accordance with equation (9). The gamma correction sections 99a, 99b and 99c make gamma corrections on the matrix-transformed R', G', and B', respectively. For the output profile storage, refer to FIG. 36.

In the case where bias values are obtained directly as shown in FIG. 25C, a bias memory 100 is provided for storing these bias values. For the above subtraction processing, the bias values stored in this memory are used as shown in FIG. 26C.

In this embodiment, since there is no need to change the output profile, it can be operated on very easily and fast.

An eighth embodiment of the color reproduction. device of the present invention will be described next.

In this embodiment, a bias sensor is provided for detecting both of monitor offset light and environment light.

Figures 27A, 27B:
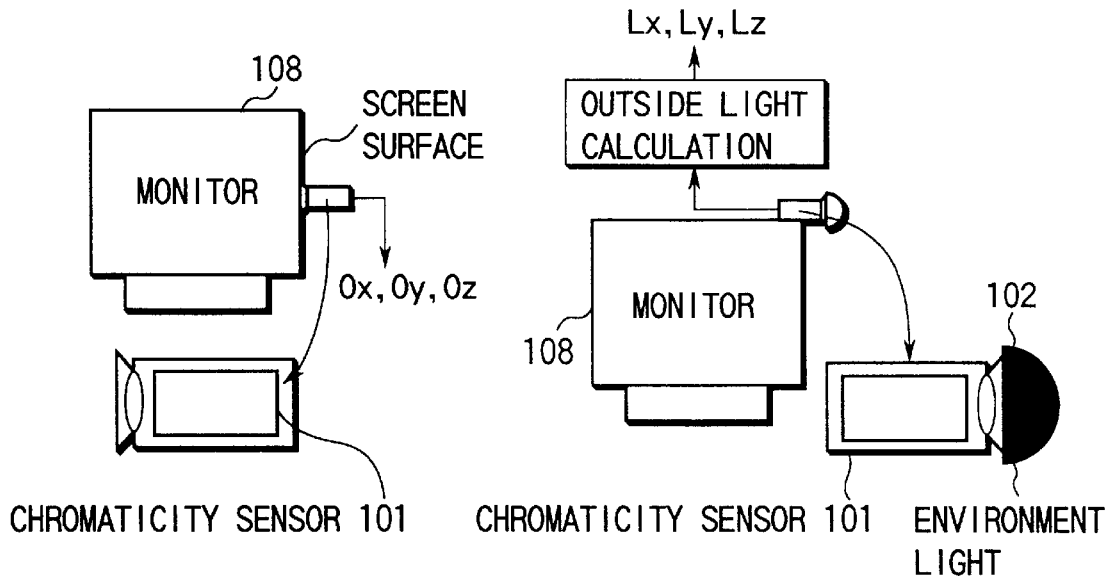
FIGS. 27A and 27B are diagrams for use in explanation of a chromaticity sensor used in an eighth embodiment of the present invention.

As shown in FIG. 27A, a chromaticity sensor 101 is brought into contact with the monitor display screen to detect offset light. To detect environment light, as shown in FIG. 27B, an environment light detecting adapter 102 is attached to the sensor 101 and the sensor is mounted on the top of the monitor.

In this case, since the chromaticity values obtained from the sensor are not ones resulting from reflection from the monitor screen, these values are converted by the environment light calculation unit to XYZ values, Lx, Ly, and Lz, associated with environment light.

The monitor offset light becomes stabilized a short time after the power has been applied to the monitor. On the other hand, environment light changes very greatly, especially if outdoor light comes.

According to the arrangement of FIG. 27B, even if the environment light changes rapidly, the change can be detected momentarily, and stabilized color reproduction can be implemented all the time.

Figures 28A, 28B:
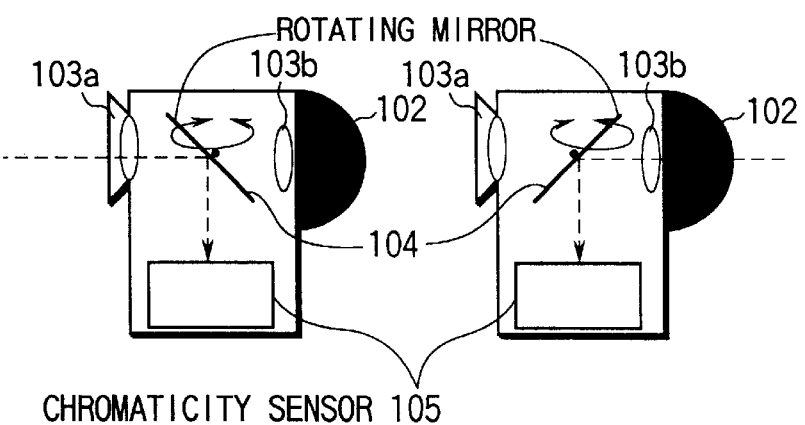
FIGS. 28A, 28B and 28C show modifications of the chromaticity sensor in the eighth embodiment.

FIGS. 28A and 28B show an arrangement of a chromaticity sensor capable of detecting both the offset light and the environment light. The sensor is provided with windows 103a and 103b which face each other and allow offset light and environment light to pass through, respectively. On the window 103b for environment light is mounted an environment light detecting adapter 102. Between the windows is placed a rotating mirror 104 which bends light coming through a window to a chromaticity sensor 105 placed underneath. By rotating the mirror 104, switching is made between offset light detection and environment light detection.

Figure 28C:
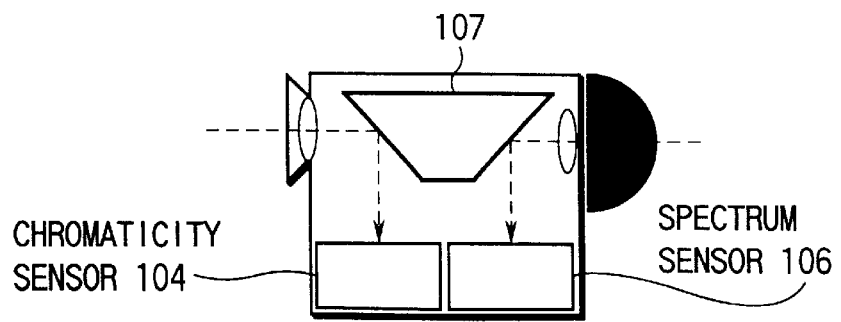

FIG. 28C shows a modification. This arrangement is equipped with a mirror 107 between the windows and chromaticity sensor 105 and spectrum sensor 106 placed underneath, allowing concurrent detection of monitor: offset light and environment light. Since the spectrum of environment light can be detected, the detected data can be used as observation-time lighting data serving as environmental information necessary for creating an input profile.

A ninth embodiment of the color reproduction device of the present invention will be described next.

Figure 29:
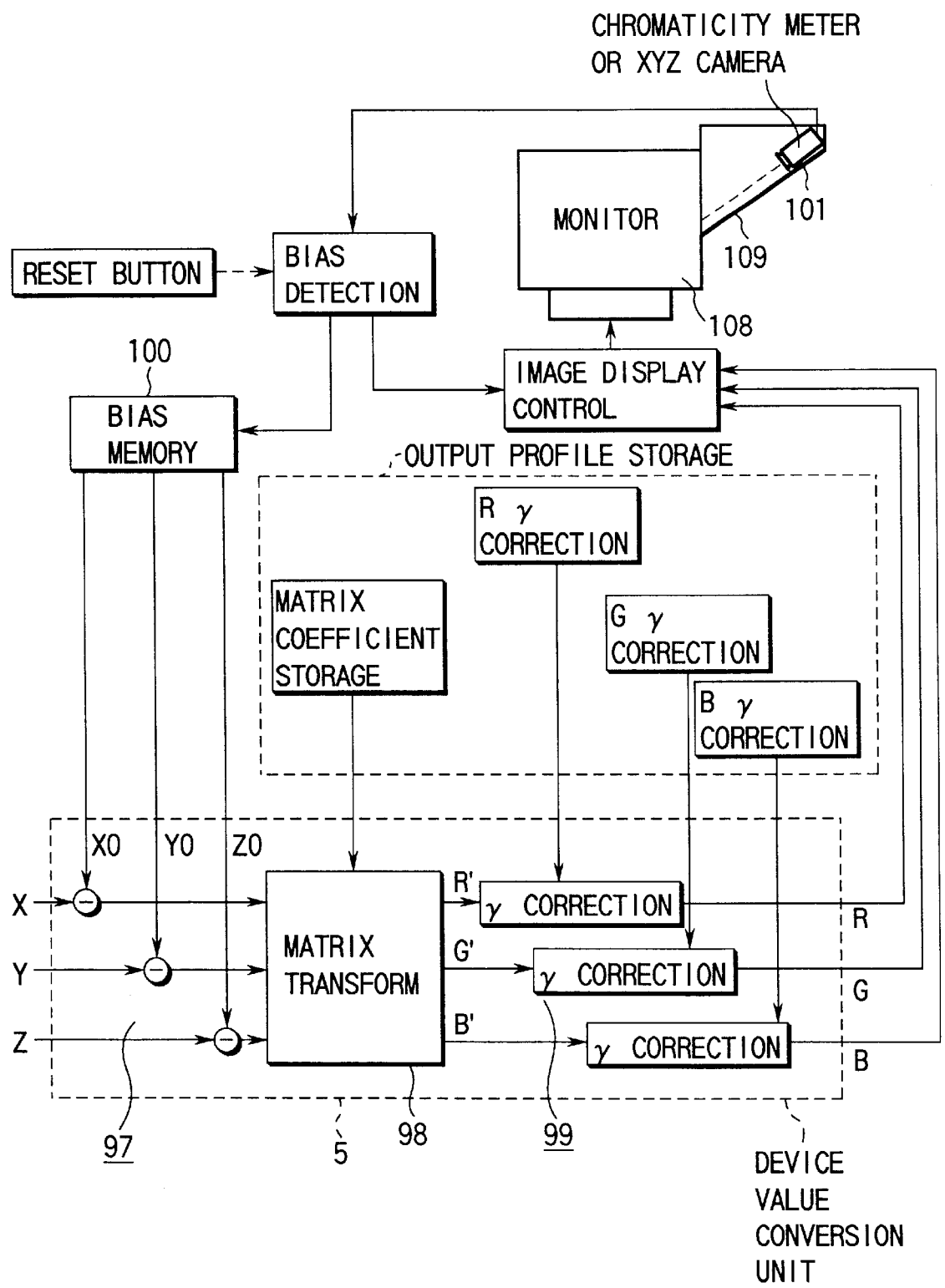
FIG. 29 shows an arrangement of a ninth embodiment of the color reproduction device of the present invention.

As shown in FIG. 29, the ninth embodiment has a chromaticity meter mounted on a hood for shielding the monitor from environment light.

If the effect of environment light is too great, it is impossible to perform accurate color reproduction irrespective of the above-described processing for environment light and offset light. In a place where accurate color reproduction is a requirement, as in a medical site where diseased parts must be identified accurately, a hood 109 will inevitably be attached to a monitor 108 to remove the effect of environment light.

In this arrangement, therefore, a chromaticity meter 101 is attached to the environment light shielding hood 109 to detect bias values.

In this arrangement, when a reset button 110 is pressed, an image of R=G=B=0 is displayed on the monitor 108, so that bias values X0, Y0 and Z0 are measured with the chromaticity meter 101. The effect of environment light is not only reduced by the use of the hood 109 but also removed by the above-described processing, which allows accurate color reproduction.

This embodiment is arranged to detect the bias values at the time when the reset button 110 is pressed. Alternatively, an R=G=B=0 image may be displayed at all times on a portion of the monitor screen, for example, at its lower right portion, to always update the bias values in accordance with variations in environment light.

Depending on the portion of the monitor screen, the bias values may vary. In such a case, instead of the chromatically meter a camera capable of measuring XYZ values may be attached to obtain bias values for each of pixels on the monitor or for each block of pixels. The resulting pixel- or block-dependent bias values are subtracted in the subtracters 97. When the hood 109 is used, environment light is reduced at the upper portion of the monitor screen but its lower portion is still affected by the environment light. In this case, if bias values that depend on the position on the monitor screen are used, then accurate color reproduction will be performed throughout the monitor screen.

Next, a tenth embodiment of the color reproduction device of the present invention will be described.

This embodiment eliminates the need for a chromaticity meter at profile creation time by preparing information necessary for profile creation beforehand within the monitor.

Figure 30:
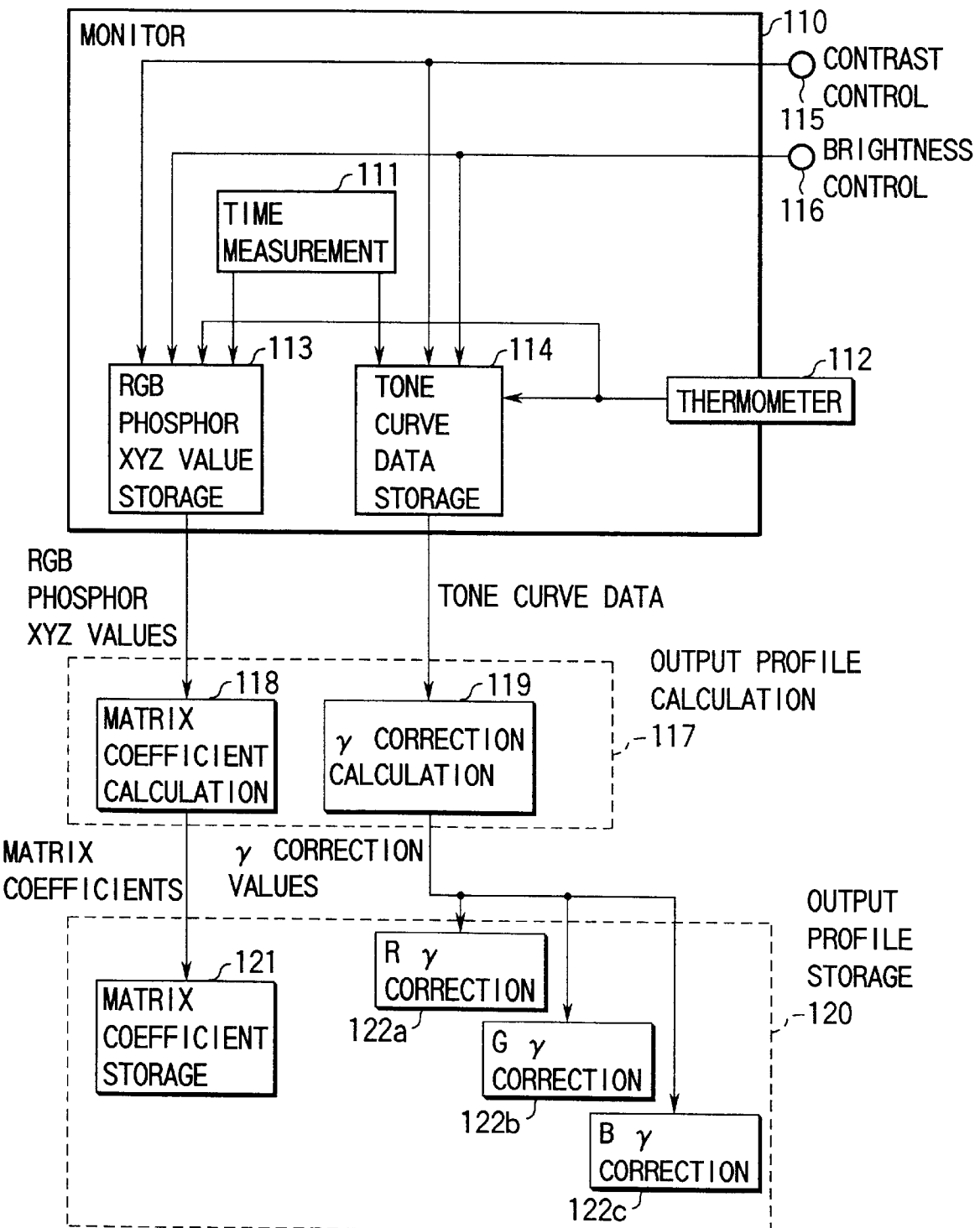
FIG. 30 shows an arrangement of a tenth embodiment of the color reproduction device of the present invention.

As shown in FIG. 30, the monitor 110 is equipped with a time measurement unit 111 for measuring the operating time of the monitor, a thermometer 112 for measuring the temperature of the monitor, an RGB phosphor XYZ value storage unit 113 for storing the XYZ chromaticity values of the RGB phosphors, and a tone curve data storage 114 for storing tone curve data. There are further provided a contrast control 115 and a brightness control 116.

An output profile calculation unit 117 comprises a matrix coefficient calculation unit 118 and a gamma correction calculation unit 119. An output profile storage unit 120 comprises a matrix coefficient storage unit 121 and RGB gamma correction tables 122a, 122b and 122c.

In the storage units in the monitor, RGB phosphor XYZ chromaticity values and tone curve data under various conditions are stored. By referring to selected XYZ chromaticity values and tone curve data, the output profile calculation unit provides matrix coefficients and gamma correction values. The various conditions are the overall operating time of the monitor since it was manufactured, the temperature, and contrast and brightness values.

This embodiment allows an output profile to be operated on very easily because it is created without using a chromaticity meter.

In this embodiment, the RGB phosphor XYZ chromaticity values and tone curve data under various conditions are stored inside the monitor; otherwise, they may be stored as file data in a personal computer and read when necessary.

Next, an eleventh embodiment of the color reproduction device of the present invention will be described. This embodiment is described in terms of a device value conversion unit for make corrections on bias values using tables in referencing an output profile.

Figure 31:
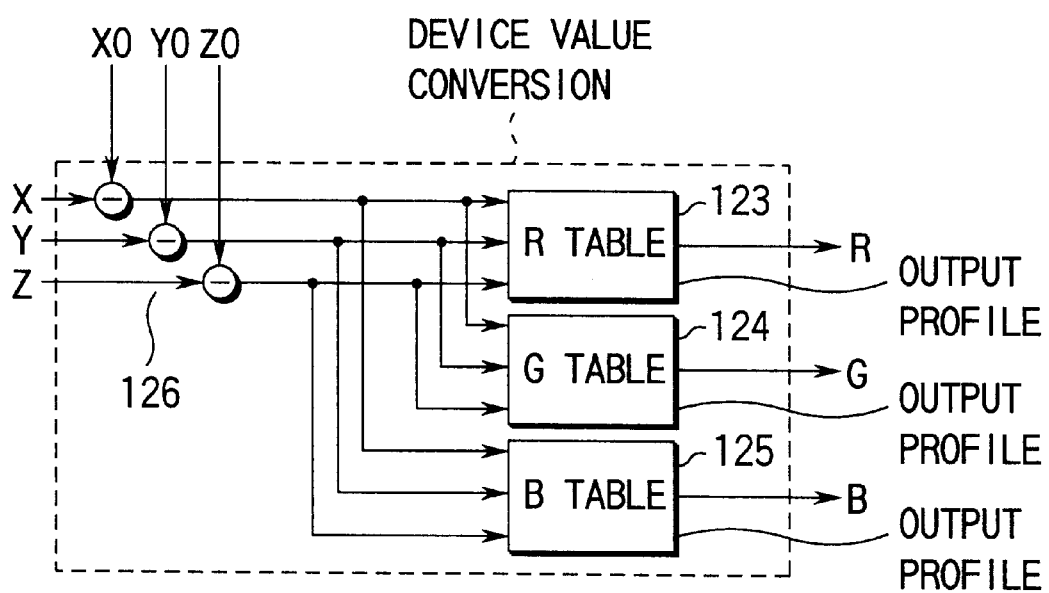
FIG. 31 shows an arrangement of the device value conversion unit in an eleventh embodiment of the color reproduction device of the present invention.
Figure 32:
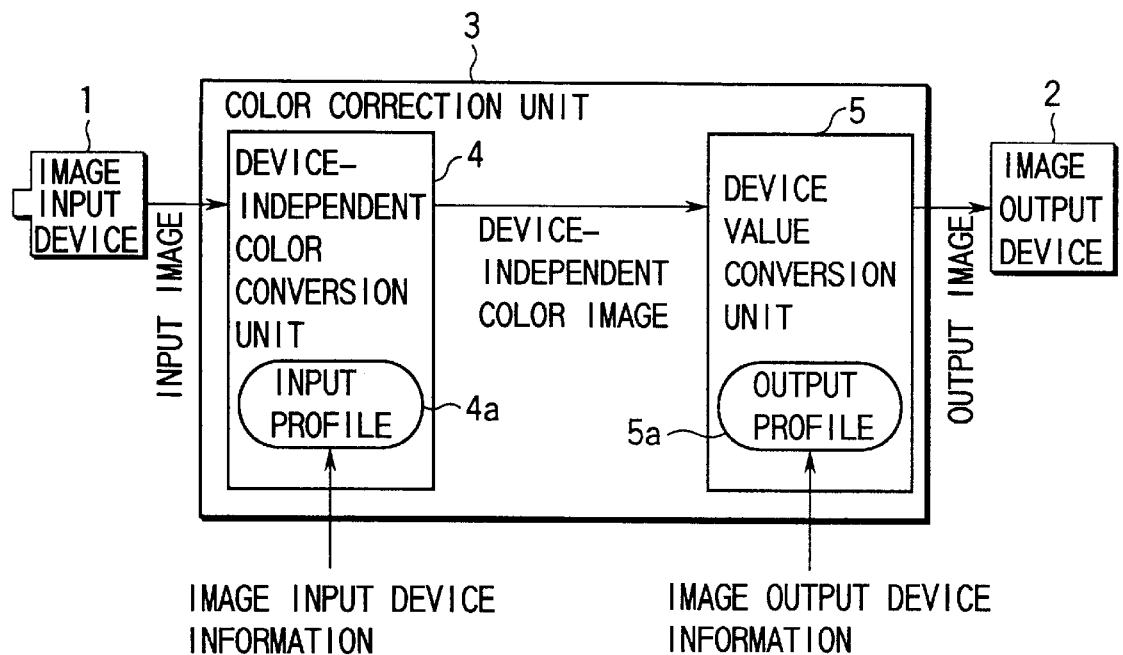
FIG. 32 is a schematic illustration of a conventional color reproduction device.
Figure 33:
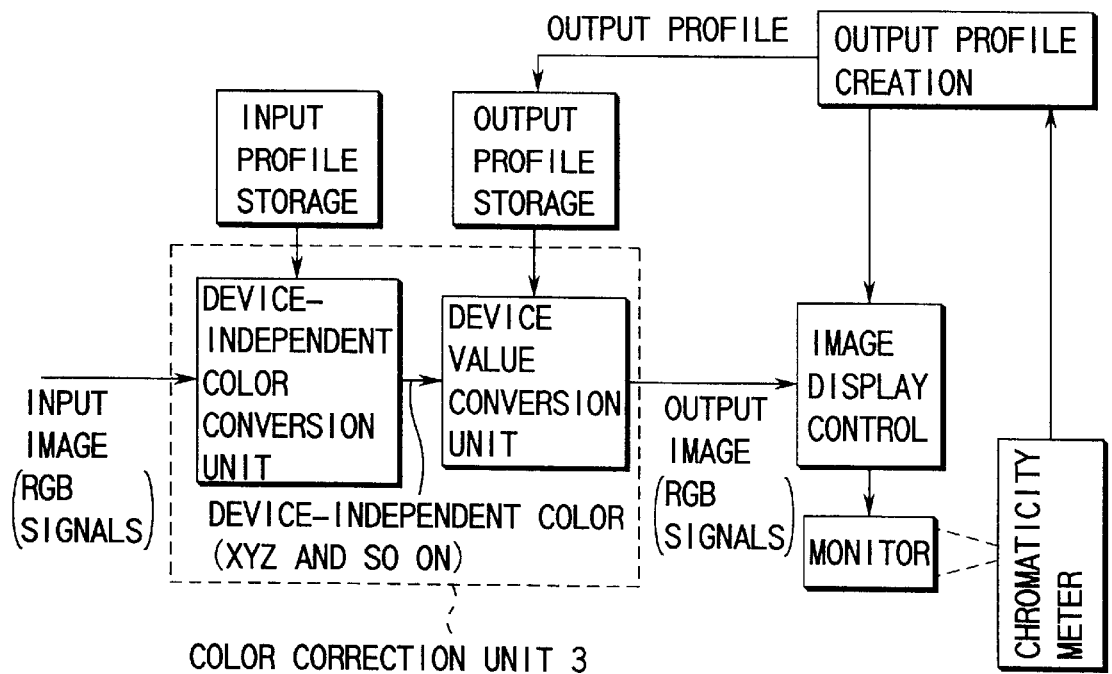
FIG. 33 shows an arrangement of the color correction unit in the conventional color reproduction device.
Figure 34:
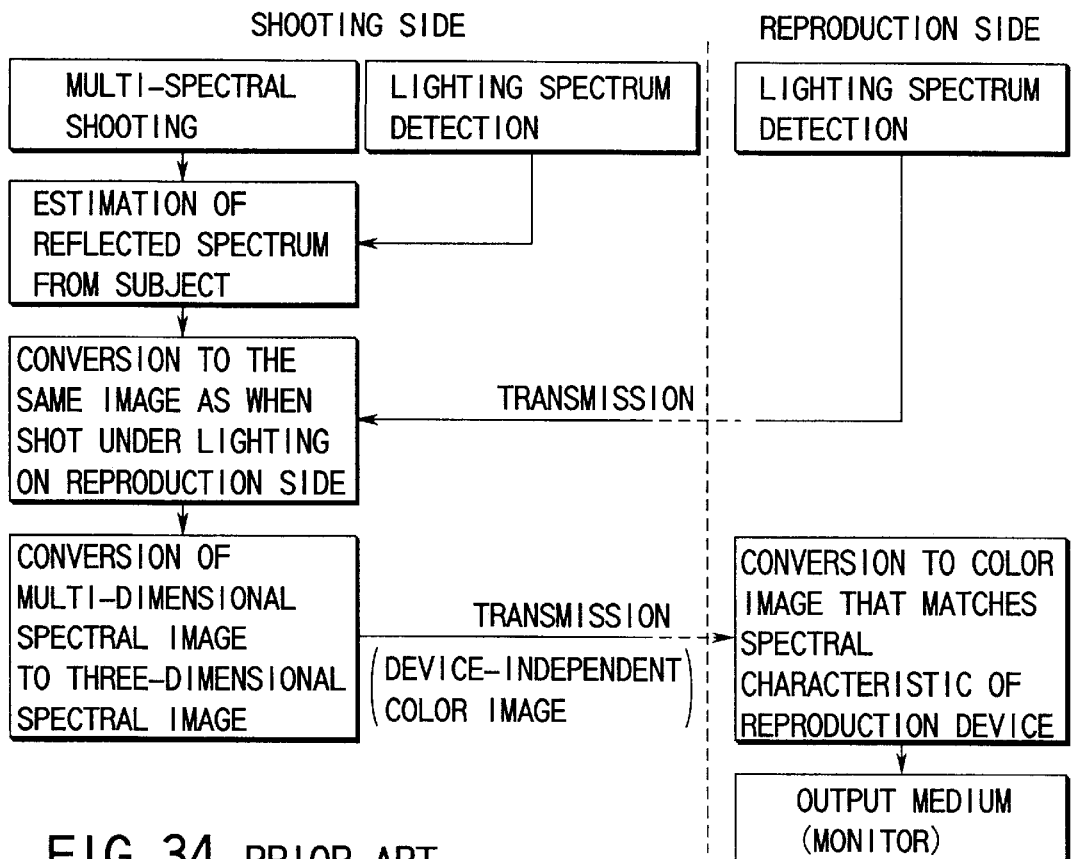
FIG. 34 shows an arrangement of a conventional color reproduction device in which a shooting site,and a reproduction site are remote from each other.
Figure 35:
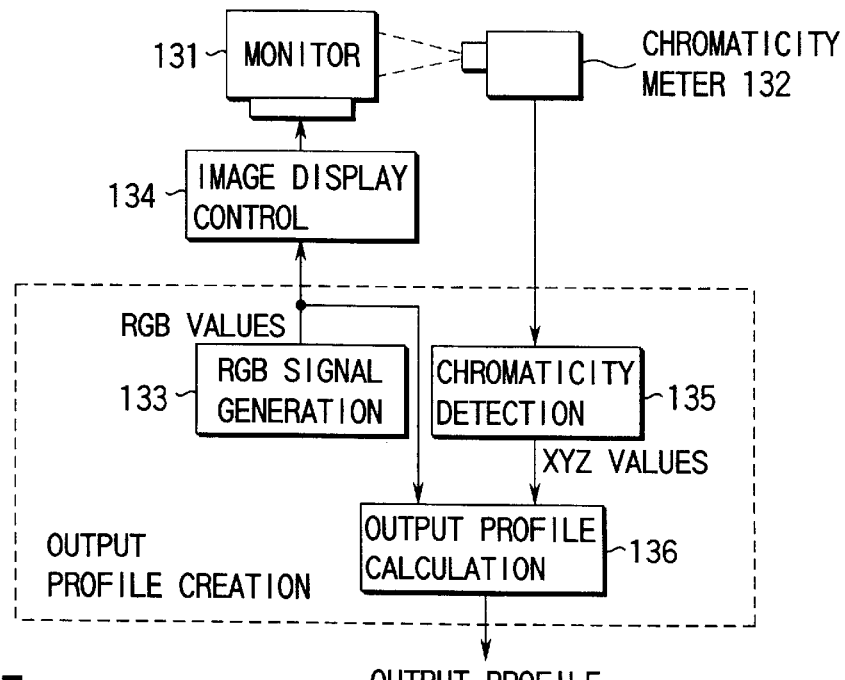
FIG. 35 shows an arrangement of the output profile creation unit in the color correction unit in the conventional color reproduction device.

The device value conversion unit, as shown in FIG. 31, comprises RGB tables 123, 124, and 125 each serving as an output profile and subtracters 126 for subtracting bias values X0, Y0 and Z0 from input XYZ values.

Thus, each of RGB values which correspond to input XYZ values can be outputted in accordance with the output profile in the corresponding table.

This embodiment and the seventh embodiment are effective for monitors that satisfy equation (11). Some monitors do not satisfy equation (11).

For such monitors, a known method is effective which stores RGB values corresponding XYZ values in tables. The bias values are corrected by, as in the seventh embodiment, subtracting bias values X0, Y0 and Z0 from X, Y, and Z values and then referencing the tables.

This embodiment, while using tables in referencing output profiles, can correct bias values associated with offset light and environment light well.

As described so far, the color reproduction devices of the present invention makes image conversion with reference to image input device information, and color reproduction environmental information comprising shooting-time and observation-time lighting spectral data, and information concerning the statistical nature of spectrum of a subject, and allows an output profile to be operated on an input image at high speed even when offset light and environment light vary, thereby achieving accurate color reproduction. Also, an image captured by an image input device can be reproduced at a remote reproduction site.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color reproduction device that converts an input image of a subject shot by an image input device into an output image having improved color reproduction for output by an image output device, said color reproduction device comprising:

color correction means for color converting the input image shot by the image input device into the output image using information concerning a color reproduction environment when the input image is shot by the image input device and when the output image output by the image output device is observed, information concerning the image input device, and information concerning the image output device; and image outputting means for outputting the output image produced by the color correction means to the image output device;

wherein the information concerning the color reproduction environment comprises subject characteristic information including statistical information about a spectrum of the subject to be shot.

2. A color reproduction device that converts an input image of a subject shot by an image input device into an output image having improved color reproduction for output by an image output device, said color reproduction device comprising:

color correction means for color converting the input image shot by the image input device into the output image using information concerning a color reproduction environment when the input image is shot by the image input device and when the output image output by the image output device is observed, information concerning the image input device, and information concerning the image output device; and image outputting means for outputting the output image produced by the color correction means to the image output device;

wherein the color correction means comprises:

a device-independent color image conversion unit including: (i) an input profile creation section for creating an input profile that conforms to the information concerning the image input device and the information concerning the color reproduction environment, and (ii) an input profile operation section for converting the input image into a device-independent color image by referencing the input profile; and a device value conversion unit including: (i) an output profile creation section for creating an output profile that conforms to the information concerning the image output device, and an output profile operation section for converting the device-independent color image into an output image composed of output values that match characteristics of the image output device.

3. The color reproduction device according to claim 2, wherein the device-independent color image conversion means comprises:

a select section for selecting appropriate information for each of the information concerning the image input device and the information concerning the color reproduction environment;

an input profile creation section for creating an input profile in a matrix form based on the selected information; and an input profile operation section for converting the input image into a device-independent color image by matrix operations using the input profile in the matrix form.

4. The color reproduction device according to claim 2, wherein:

the input profile operation section receives the input image from one of the image input device, a network that connects to external devices, and a storage medium, the input profile creation section receives the input image from one of the image input device, the network, and the storage medium, and the information concerning the image input device and the information concerning the color reproduction environment from a dedicated input device, the output profile creation section receives the information concerning the output device from one of the dedicated input device, the network, and the storage medium, and each of the operation and creation sections includes an input information select section.

5. The color reproduction device according to claim 2, wherein the output profile operation section includes means for selectively outputting the output image to one of the image output device, a storage medium and a network.

6. The color reproduction device according to claim 2, wherein the image input device is provided with image data detecting means for detecting image data from an optical image of the subject through a photoelectric effect and a spectroscope for detecting spectral data, thereby concurrently measuring the image data and the spectral data on lighting used in shooting the subject with the image input device or statistical data on the spectrum of the subject.

7. The color reproduction device according to claim 2, wherein the color correction means includes an information database for storing at least one of the information concerning the image input device, the information concerning the color reproduction environment, and the information concerning the image output device, and, at a time of creation of an input profile or output profile, the color correction means receives desired data.

8. The color reproduction device according to claim 2, further comprising a color correction preprocessing section for converting image data captured by the image input device into a lighting convertible data structure using at least one of the information concerning the image input device, spectral data on lighting used in shooting the subject with the image input device, and statistical data on a spectrum of the subject, and wherein the color correction means processes the image data in the lighting convertible data structure to produce color image data under desired observation lighting.

9. The color reproduction device according to claim 8, wherein the lighting convertible data structure comprises a plurality of image data assigned to band numbers, shooting-time lighting data, and shooting characteristic data concerning the image input device.

10. The color reproduction device according to claim 2, wherein the image input device comprises a lens, an image pickup device for converting an optical image of the subject into an electrical signal, a signal processor for processing image information including the electrical signal, and a lighting sensor for detecting lighting in a shooting site.

11. The color correction device according to claim 10, wherein a recording medium is removably attachable to the color correction means, and the color correction means comprises an output profile select section for selectively outputting from a plurality of output profiles which have been set up beforehand an output profile that is suitable for image data stored in the recording medium, a lighting detector for detecting lighting around the image output device for reproducing an image inputted from the image input device, an observation lighting select section for selectively outputting color correction data necessary for color correction from lighting data read from the recording medium and a detected signal from the lighting detector, and a color correction section for correcting the image data read from the recording medium based on the color correction data.

12. The color reproduction device according to claim 11, wherein the removable recording medium has recorded thereon image data for commodities classified according to colors and observation-time lighting data.

13. The color reproduction device according to claim 12 wherein the image output device combines an image recorded on the recording medium and the image input by the image input device to form an image in which a part corresponding to the image recorded on the recording medium bears a color corresponding to a same observation light as the image input by the image input device.

14. The color reproduction device according to claim 2, wherein the image input device comprises a spectroscope for detecting a spectrum of an image captured by a lens, an image pickup device for converting the image into an electrical signal, and a turret placed in front of the image pickup device and having a plurality of bandpass filters for capturing a plurality of spectral images.

15. The color reproduction device according to claim 2, wherein the device value conversion means comprises subtractors for subtracting bias values dependent on environment light surrounding the image output device and offset light of the image output device from the device-independent color image and, after the subtraction, converts the device-independent color image to an output image in the output profile operation section by referencing an output profile.

16. A color reproduction device that converts an input image of a subject shot by an image input device into an output image having improved color reproduction for output by an image output device, said color reproduction device comprising:
    color correction means for color converting the input image shot by the image input device into the output image using information concerning a color reproduction environment when the input image is shot by the image input device and when the output image output by the image output device is observed, information concerning the image input device, and information concerning the image output device; and
    image outputting means for outputting the output image produced by the color correction means to the image output device;
    wherein the information concerning the color reproduction environment comprises data on a spectrum of lighting when the subject is shot by the image input device and data on a spectrum of lighting in a place where an image of the subject shot is observed, and the information is created each time a subject is shot.

17. The color reproduction device according to claim 16, wherein the information concerning the image input device comprises information concerning characteristics of the image input device used in shooting the subject and settings of functions of the image input device, and the information is created each time a subject is shot.

18. The color reproduction device according to claim 1, wherein the information concerning the image input device comprises information concerning characteristics of the image input device used in shooting the subject and settings of functions of the image input device, and the information is created each time a subject is shot.

19. A color reproduction device that converts an input image of a subject shot by an image input device into an output image having improved color reproduction for output by an image output device, said color reproduction device comprising:
    color correction means for color converting the input image shot by the image input device into the output image using information concerning a color reproduction environment when the input image is shot by the image input device and when the output image output by the image output device is observed, information concerning the image input device, and information concerning the image output device; and
    image outputting means for outputting the output image produced by the color correction means to the image output device;
    wherein the color correction means comprises a first color correction means for producing a device-independent color image based on the input image, the information concerning the color reproduction environment and the information concerning the image input device, and a second color correction means for making color conversion on the device-independent color image based on the information concerning the image output device to produce the output image, and
    wherein transmission of the device-independent color image from the first to the second color correction means is made via a storage medium or a network.

20. A color reproduction device that converts an input image of a subject shot by an image input device into an output image having improved color reproduction for output by an image output device, said color reproduction device comprising:

color correction means for color converting the input image shot by the image input device into the output image using information concerning a color reproduction environment when the input image is shot by the image input device and when the output image output by the image output device is observed, information concerning the image input device, and information concerning the image output device; and image outputting means for outputting the output image produced by the color correction means to the image output device;

wherein the color correction means comprises:

an input/output profile creation section for creating an input/output profile based on the information concerning the image input device, the information concerning the color reproduction environment, and the information concerning the image output device; and an input/output profile operation section for converting the input image to the output image by referencing the input/output profile.

21. The color reproduction device according to claim 20, wherein:

the input profile operation section receives the input image from one of the image input device, a network that connects to external devices, and a storage medium, the input profile creation section receives the input image from one of the image input device, the network, and the storage medium, and the information concerning the image input device and the information concerning the color reproduction environment from a dedicated input device, the output profile creation section receives the information concerning the output device from one of the dedicated input device, the network, and the storage medium, and each of the operation and creation sections includes an input information select section.

22. The color reproduction device according to claim 20, wherein the image input device is provided with image data detecting means for detecting image data from an optical image of the subject through a photoelectric effect and a spectroscope for detecting spectral data, thereby concurrently measuring the image data and the spectral data on lighting used in shooting the subject with the image input device or statistical data on the spectrum of the subject.

23. The color reproduction device according to claim 20, wherein the color correction means includes an information database for storing at least one of the information concerning the image input device, the information concerning the color reproduction environment, and the information concerning the image output device, and, at a time of creation of an input profile or output profile, the color correction means receives desired data.

24. The color reproduction device according to claim 20, further comprising a color correction preprocessing section for converting image data captured by the image input device into a lighting convertible data structure using at least one of the information concerning the image input device, spectral data on lighting used in shooting the subject with the image input device, and statistical data on a spectrum of the subject, and wherein the color correction means processes the image data in the lighting convertible data structure to produce color image data under desired observation lighting.

25. The color reproduction device according to claim 20, wherein the image input device comprises a lens, an image pickup device for converting an optical image of the subject into an electrical signal, a signal processor for processing image information including the electrical signal, and a lighting sensor for detecting lighting in a shooting site.

26. The color reproduction device according to claim 20, wherein the image input device comprises a spectroscope for detecting a spectrum of an image captured by a lens, an image pickup device for converting the image into an electrical signal, and a turret placed in front of the image pickup device and Having a plurality of bandpass filters for capturing a plurality of spectral images.

* * * * *